United States Patent [19]

Troudet

[11] Patent Number: 5,554,032
[45] Date of Patent: Sep. 10, 1996

[54] ADAPTIVE SYSTEM BASED ON INDICIA APPLIED TO THE FINGERS FOR TOUCH-TYPING/TRAINING

[76] Inventor: Farideh Troudet, 18612 Buccaneer Creek, P.O. Box 360664, Strongsville, Ohio 44136

[21] Appl. No.: 328,393

[22] Filed: Oct. 24, 1994

Related U.S. Application Data

[63] Continuation of Ser. No. 912,874, Jul. 13, 1992, abandoned, which is a continuation-in-part of Ser. No. 770,610, Oct. 3, 1991, abandoned.

[51] Int. Cl.$^6$ .................................................. G09B 13/04
[52] U.S. Cl. ................................................................ 434/233
[58] Field of Search ...................................... 434/233, 227, 434/230, 231, 112, 117, 229; 2/159; 84/470 R, 477 R, 478, 485 R

[56] References Cited

U.S. PATENT DOCUMENTS

| | | | |
|---|---|---|---|
| 1,823,130 | 9/1931 | Smith | 434/227 X |
| 2,570,908 | 10/1951 | Behr | 434/233 |
| 3,258,858 | 7/1966 | Cariffe, Jr. | 434/260 |
| 3,501,849 | 3/1970 | Olsen | 434/233 |
| 3,831,296 | 8/1974 | Hagle | 434/112 |
| 4,414,537 | 11/1983 | Grimes | 434/229 X |
| 4,519,781 | 5/1985 | Boyd | 434/211 X |
| 4,846,687 | 7/1989 | White et al. | 434/112 |
| 4,902,231 | 2/1990 | Freer | 434/227 |
| 4,909,739 | 3/1990 | Ladner et al. | 434/233 |
| 5,199,876 | 4/1993 | Waldman | 434/262 |

FOREIGN PATENT DOCUMENTS

| | | |
|---|---|---|
| 1357068 | 2/1964 | France . |
| 0931038 | 7/1963 | United Kingdom . |
| 1581453 | 12/1980 | United Kingdom .................. 434/112 |

*Primary Examiner*—Gene Mancene
*Assistant Examiner*—Jeffrey A. Smith
*Attorney, Agent, or Firm*—Frank H. Foster; Kremblas, Foster, Millard & Pollick

[57] ABSTRACT

Educational devices using process-oriented educational methods are disclosed to prepare pre-school children, school children, and teenagers for keyboarding. The devices include sets of gloves and indicia applied to the fingers of the gloves to provide pictorial and alphanumeric representations of the computer keyboard. The visual and tactile memorization of the glove images are complemented by auditory and associative memorization provided by a story-telling educational method. Synergistic use of the gloves in the context of supervised story-telling also trains the pre-school children to develop and practice both lateral and vertical thinking skills[1-2], thus preparing them for coping creatively with the inherent hardware/software limitations of computers. The memorization of the alphanumeric representation of the computer keyboard is reinforced through synergistic use of the gloves in a variety of activities including learning the alphabet, learning word-spelling, and learning languages. To best fit the psychology of teenagers, a set of picture-rings is disclosed to specifically prepare that age-group for keyboarding.

32 Claims, 31 Drawing Sheets

ADAPTIVE SYSTEM BASED ON INDICIA APPLIED TO THE FINGERS FOR TOUCH-TYPING/TRAINING

This is a continuation of application Ser. No. 07/912,874 filed on Jul. 13, 1992, and now abandoned, which is a continuation-in-part of application Ser. No. 07/770,610 filed Oct. 3, 1991, and now abandoned.

BACKGROUND OF THE INVENTION

1. Field of the Invention

Computers are playing an ever more important role in the economical, scientific, and educational development of our society. It is therefore not uncommon to see curricula granting them a significant role in the educational process of young children.

Children are most likely to fully utilize the resources that computers have to offer, as they become more comfortable in interacting with their physical interface, in particular the keyboard. Although computer interfacing has been greatly simplified through the standardization of the touch-typing keyboard, much is to be gained from educational systems that can help children to painlessly develop the needed keyboarding skills, as early as pre-school age.

After acquiring keyboarding skills, children will need both lateral and vertical thinking to express their ideas as freely as possible with the computer while accommodating for its hardware/software limitations.

Therefore, much is to be gained from wholistic educational systems that can motivate children, as early as pre-school age, to develop their lateral and vertical thinking skills, while preparing them for keyboarding.

2. Analytical Description of the Relevant Art

Since the invention of the first type-writer, various means and devices have been proposed to teach/train students to type, or to type more efficiently, as exemplified by the following United States and Foreign Patents.

U.S. Pat. No. 4,909,739 issued in 1990 to Ladner et al. entitled "Interactive Typing/Training System" discloses a set of color-coded finger guides to be worn at the top of the hand, and indicating the character of the home key that each finger is to be used for in touch-typing. The color-coding of the keys of the keyboard match the color-coding of the finger guides to indicate to the typist which keys each finger should be used for.

U.S. Pat. No. 2,570,908 issued in 1949 to Behr entitled "Indicator To Be Worn On The Hands While Learning To Typewrite" discloses a device constructed so as to be secured on the hand without impeding the use of the fingers in any way, and showing to the typist the correct keys of a type-writer to be struck by each finger, and the position of the keys relative to the actuating finger.

In the aforementioned patents by Ladner and Behr, the key-finger assignment of the keyboard is indicated to the student-typist by means of devices which represent the keys by the letters and numbers they bear, as specified by the standardized keyboard. Such key-finger assignment cannot however be used by preschool children, since they do not yet know their alphabet nor their numbers. Moreover, the systems disclosed by Ladner and Behr are to be used by students in the actual act of touch-typing, or keyboarding. The latter training devices have therefore been specifically designed so as not to obstruct the student view of the keyboard, nor impede the free motion of the fingers. Such specificities are of no benefit to pre-school children, since it is highly desirable that they do not actually use the keyboard (because of the fragility of their joints), and are moreover responsible for the awkward characteristics of the aforementioned hand indicators, which would make them impractical to be worn by pre-school children.

U.S. Pat. No. 3,501,849 issued in 1970 to Olsen entitled "Method And Device For Teaching Typing And Language Skills" discloses a set of color-coded bands worn on each finger of the typist, and a set of color-coded discs to be affixed on the keys of a typewriter, whereby the color matching between bands and keys indicate to the typist which keys each finger should be used for.

French Pat. No. 925,459 issued in 1964 to Azan entitled "Dispositif pour le guidage cybernétique des doigts dans l'apprentissage de la dactylographie et per mettre la correction de la mauvaise dactylographie" discloses a set of rings to be worn by the student typist. The letters assigned to each ring show to the typist the correct keys of a type-writer to be struck by each finger.

British Pat. No. 931,038 issued in 1963 to Haid entitled "Typewriter Key Markers to Teach Touch Typing" discloses rings which can be placed upon the fingers, and which have the color which marks the keys associated with any particular finger.

U.S. Pat. No. 623,966 issued in 1899 to Barkley entitled "Method Of And Apparatus For Type-Writer Instruction" discloses a set of rings to be worn by a typist with the aim of acquiring speed. The letters assigned to each ring show to the typist the correct keys of a type-writer to be struck by each finger.

In the aforementioned patents by Azan, Haid, and Barkley, the disclosed keyfinger assignments are based on indexing the keys of the keyboard by the letters they bear (which index said keys), and therefore could not be used by pre-school children, since they do not know their alphabet.

Although the aforementioned ring sets can in principle be used by any student-typist who knows how to read, the bare representation of the keyboard in terms of plain letters can be in practice de motivating for young learners who usually look for excitement in any learning process. Without nurturing the student with opportunities for associative memorization, the learning process may indeed be reduced to just practising the keyboard, and shy away many potential teenager students.

U.S. Pat. No. 4,465,477 issued in 1984 to AvGavaar entitled "Typewriter Instruction Device" discloses a device consisting of small ferromagnetic tips to be worn by the typist at the ends of his fingers, while the typewriter keys have electromagnets which attract the correct finger when a certain key has to be struck. These electromagnets could be attached at the fingertips by means of gloves, fingercots, or adhesives.

By requiring actual use of the keyboard and knowledge of the alphabet, the training system disclosed by AvGavaar is not adapted to prepare pre-school children for keyboarding for the same reasons mentioned above.

U.S. Pat. No. 4,902,231 issued in 1990 to Freer entitled "Learn To Type Via Mnemonic Devices, And Methods Of Constructing And Utilizing Same" discloses a large chart depicting the standardized computer keyboard, and mnemonic means including visual aids and phrases to help the student typist remember the locations of the keys. The chart is to be positioned within the view of the typing students.

Pre-school children do not know their alphabet, and therefore could not benefit from Freer's mnemonic devices that are based on phrases and pictures showing the phrases. Moreover, the letters indexing the keys of the keyboard are associated in irregular patterns within either words or phrases, which makes it difficult to identify these indexing letters from the pictures. Such mnemonic devices are addressed to the student-typist who knows how to read and make sentences, and present a degree of complexity by far exceeding the level of young children. Moreover, these mnemonic devices are applied to a large chart to be positioned within the view of the student-typist, preferably on the wall of a classroom, which would be of little practicality and convenience for a pre-school child in home environment.

There is therefore a need for process-oriented educational systems that are not only attractive to the child, but also easy-to-use and easy-to-be-accessed, in order to start the keyboarding training process as early as the pre-school-age group.

The present invention differs from the prior art in that it answers the aforementioned need, and provides simple picture-based (or object-based) devices using process-oriented methods in order to:

1) prepare the pre-school child (and any illiterate child or adult) for keyboarding before he has even learned the alphabet and the numbers;

2) while developing his lateral and vertical thinking;

3) and thereby realize a wholistic preparation of the pre-school child (and any illiterate child or adult) towards coping creatively with the inherent hardware/software limitations of the computer;

4) prepare teenagers for keyboarding through a learning process that is well adapted to the behavioral characteristics of that age-group.

Further advantages, and differences from the prior art are contained in the further objects and characteristics of the invention, as disclosed in the following summary and detailed description of the invention.

SUMMARY OF THE INVENTION

The present invention relates to educational devices using process-based methods for training various age groups to memorize the key-finger assignment of the keyboard, and in particular for preparing pre-school children for keyboarding while developing their lateral and vertical thinking.

The devices disclosed comprise various sets of gloves and rings which are to be worn accordingly by pre-school children, school children, and teenagers. These gloves and rings provide various representations of the keyboard, and various mnemonic means to facilitate the memorization of the key-finger assignment. The mnemonic means include various types of indicia mounted on the fingers of the gloves and on the rings. The choice of indicia is adaptive to the needs and psychology of each individual child or teenager.

For the pre-school child who has not yet learned his alphabet, the indicia comprise pictures defining objects, which object names begin with the letter corresponding to the key of the keyboard to be struck by the proper finger. The indicia evolve with the learning process into an association of pictures and letters for teaching the alphabet to the pre-school child in the context of the key-finger assignment of the keyboard.

After the pre-school child has learned his alphabet with his/her mnemonic gloves, the set of indicia is reduced to the alphanumeric characters of the keyboard, i.e. the letters, numbers, and punctuation symbols. The child then further learns to memorize the location of the keys in the keyboard.

Towards further reinforcing the memorization of the key-finger assignment of the keyboard, the indicia are then extended to incorporate word-spelling and language vocabulary. With these new sets of indicia, the school child or teenager will be motivated to use his/her knowledge of the keyboard for learning how to spell and for learning a foreign language. In return, these new learning activities will also strengthen the memorization of the keyboard.

It is an object of the invention to meet adaptively the psychological and behavioral needs of each age group to motivate the child/teenager to learn the standardized keyboard.

It is therefore an object of the invention to prepare pre-school children for keyboarding by providing them mnemonic means to start learning the key-finger assignment of the keyboard; yet without training them to actually practice on the keyboard to begin with, because of the fragility of their joints.

It is also an object of the present invention to provide a comfortable and protective feeling to the pre-school child to be encouraged to learn as early as three-year old. There lies the motivation for choosing the picture gloves to meet the child's needs for control and comfort. The fact that these gloves do not give to the fingers the mobility and sense of touch that is needed by the typist actually using the keyboard is of no relevance to the scope of the present invention, since the preschool child will not practice at the keyboard to begin with. This structural characteristic of the present invention sets it further apart from the prior art which primarily aimed at securing unhindered use of the fingers in using the keyboard, without giving prime consideration to the psychological and behavioral needs of the learner.

It is a further object of the invention to help the pre-school child memorize his pictures and their locations on his/her glove fingers. The fact that the learner typist would not be able to see the images at the tip of his fingers is of no relevance to the scope of the present invention, since the pre-school child will not practice at the keyboard to begin with. The latter structural characteristic of the present invention sets it further apart from the prior art which primarily aimed at providing the learner typist with an unobstructed view of the key-finger assignment, without giving prime consideration to the impracticalities resulting from such a requirement (e.g. upward finger like extensions leaving the top of the hands).

It is also an object of the invention to address the dual needs of teenagers for peer group communication and secrecy towards facilitating their learning of the keyboard. There lies the motivation for choosing the picture rings that have the dual characteristics of being both attractive and mysterious.

It is a further object of the invention to provide mnemonic aids in terms of column (vertical series of images on each finger), row (lateral series of images handwide), and matrix (array of pictures on each picture-glove) to facilitate the memorization of the representation of the keyboard.

Another object of the present invention is to allow for tactile memorization of the shapes and textures of the pictures, thus enabling the use of these mnemonic gloves by a visually-impaired learner.

Another object of the present invention is to reinforce the memorization of the glove pictures by means of auditory and mental associations in the context of storytelling. For example, the puzzling shapes of the punctuation symbols on the right little finger (corresponding to the P-key) could be introduced to the pre-school child in a fun way with the intriguing story of Piggy (for the letter P):

"Once upon a time, there was a little Pig named "Piggy".

Piggy was all pink but had a black tail.

Because of its black tail, the other little pigs would not play with him.

So, Piggy was all alone, and very sad.

On the tenth day of Christmas, "Piggy" decided to have fun and be happy in spite of all.

So, he went to pick the "dot" over the letter "i" in his name "Piggy", and he attached its black curly tail to it.

"Piggy" laughed so much when he realized he had created a "semi-colon".

(Can you see the semi-colon on your Magic Gloves?)

Then, "Piggy" went on attaching the dot to its black curly tail.

"Piggy" laughed so much when he realized he had created a "question-mark".

(Can you see the question-mark on your Magic Gloves?)

"Piggy" was more and more happy about his black tail.

When he pulled on his curly black tail, he was so happily surprised to create a "slash".

(Can you see the "slash" sign on your Magic Gloves?).

With his new creative skills, "Piggy" felt brave enough to go and challenge the other little pigs.

So, Piggy went and picked the "dot" from the "i" in the name of another little Pig, and he put it exactly above his own "dot".

When the other little pigs realized that "Piggy" had just created a "colon", they all laughed so much.

(Now can you find the colon on your Magic Gloves?).

Now in the village, every little pig is talking about "Piggy" and his black curly tail.

It is a further object of the invention to train the child how to relate the pictures with one-another on each finger in the context of story-telling, thereby setting the foundations for the intellectual framework that he/she will need later in his/her adult life in relating concepts, systems, and disciplines altogether.

It is also an object of the invention to educate the pre-school child to simultaneously deal with the concepts of limitation and freedom by motivating him to invent and tell his own stories within the limitation of the glove pictures, with the goals of:

1) training the pre-school child to simultaneously practice his lateral and vertical thinking;
2) indirectly raising the child's awareness to the future necessity of learning about the hardware/software limitations of the computer (e.g. programming language) to be able to use it as creatively and productively as possible;
3) exposing the child at a very early age to the art of compromise, in teaching him the importance of accommodating for the limitations of the outside world without suppressing his own creative abilities.

It is an advantage of the present invention to generate dynamic interactions between parents (or care-takers) and children, thereby involving the parents, or grandparents, in the child education at the earliest stages of the educational process.

The above as well as further objects, essential details and advantages of the invention will become apparent from the following detailed description of the devices, and their utilization in conjunction with the story-telling educational method.

2a: left-hand glove with picture-indicia worn on the left hand of a user;

2b: right-hand glove with picture-indicia worn on the right hand of a user.

FIG. 3 depicts elevated views of gloves with color-coded picture-indicia on the back portions (illustrated with a first style of gloves) and alphanumeric indicia on the palm portions (illustrated with a second style of gloves):

3a: back portion of a first left-hand glove with picture-indicia;

3b: palm portion of a second right-hand glove with alphanumeric indicia;

3c: back portion of a first right-hand glove with picture indicia;

3d: palm portion of a second left-hand glove with alphanumeric indicia.

FIG. 4 depicts elevated views of gloves with object-indicia on the back portions (illustrated with a first style of gloves) and raised Braille-indicia on the palm portions (illustrated with a second style of gloves) for use by a visually impaired person:

4a: back portion of a first left-hand glove with object-indicia;

4b: palm portion of a second right-hand glove having Braille indicia, with a possible opening in the thumb portion for tactile recognition;

4c: back portion of a first right-hand glove with object-indicia;

4d: palm portion of a second left-hand glove having Braille indicia, with a possible opening in the thumb portion for tactile recognition (together with a side view of the Braille representation of the letter "p").

FIG. 5 depicts elevated views of gloves with color-coded picture-indicia on the back portions (illustrated with a first style of gloves) and sign-language-indicia on the palm portions (illustrated with a second style of gloves) for use by a hearing-impaired person:

5a: back portion of a first left-hand glove with picture-indicia;

5b: palm portion of a second right-hand glove with sign-language indicia;

5c: back portion of a first right-hand glove with picture-indicia;

5d: palm portion of a second left-hand glove with sign-language indicia.

Figure 6A:
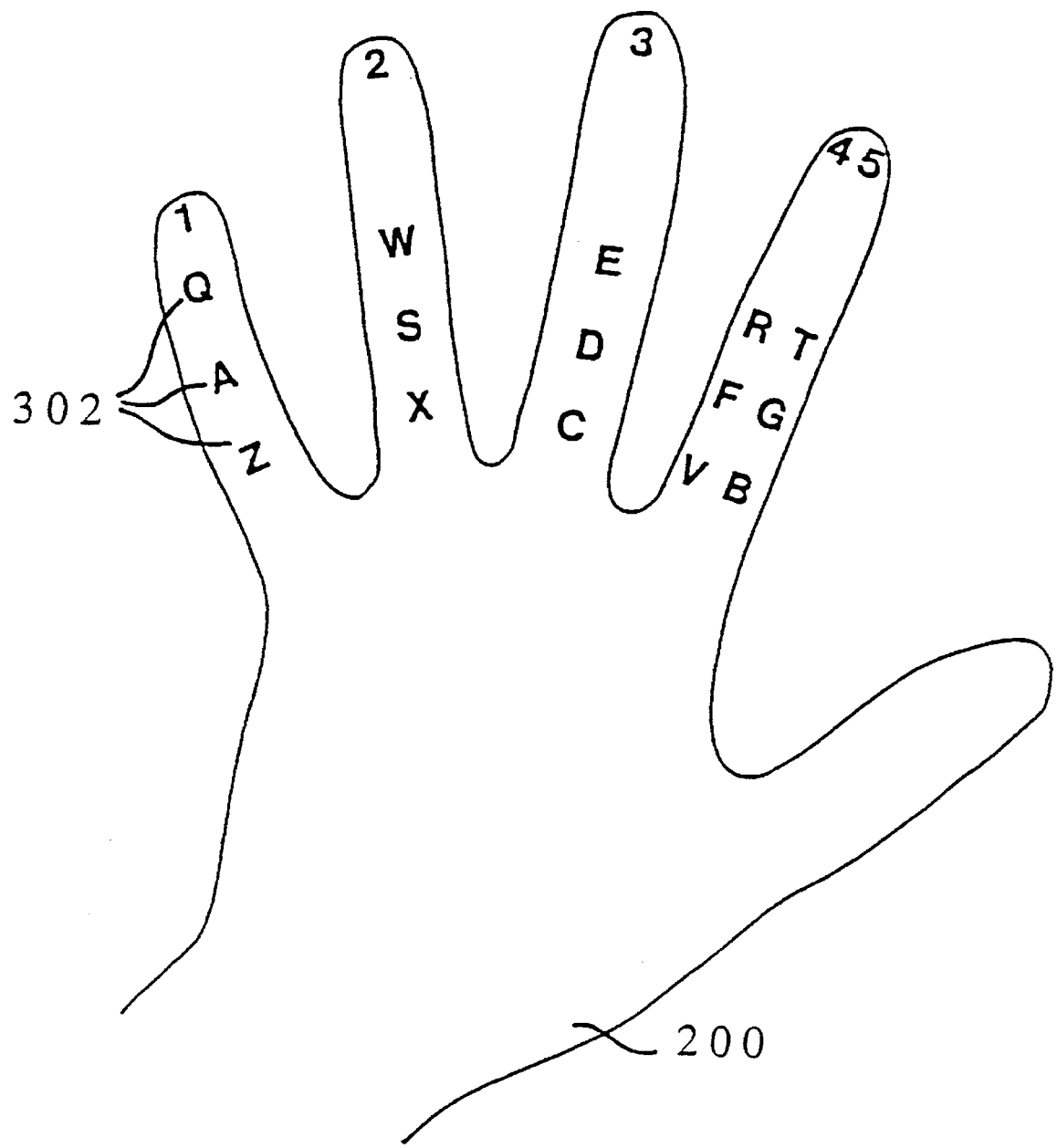
Figure 6B:
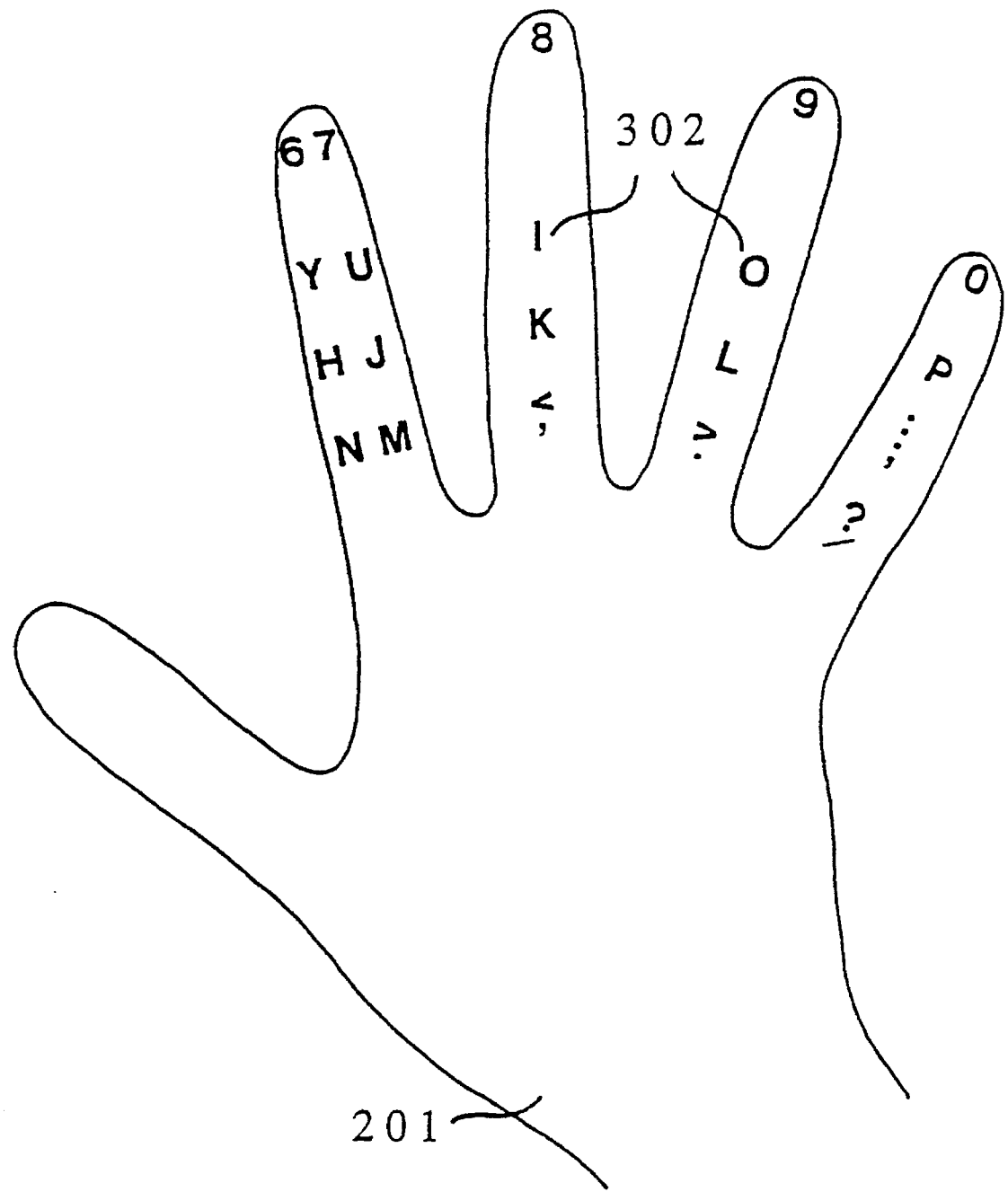

FIG. 6 depicts elevated views of alphanumeric gloves (i.e. letters, numbers, and punctuation symbols of the keyboard mounted on the back portions) with color-coded fingers:

6a: back portion of left hand glove;

6b: back portion of right hand glove.

Figure 1:
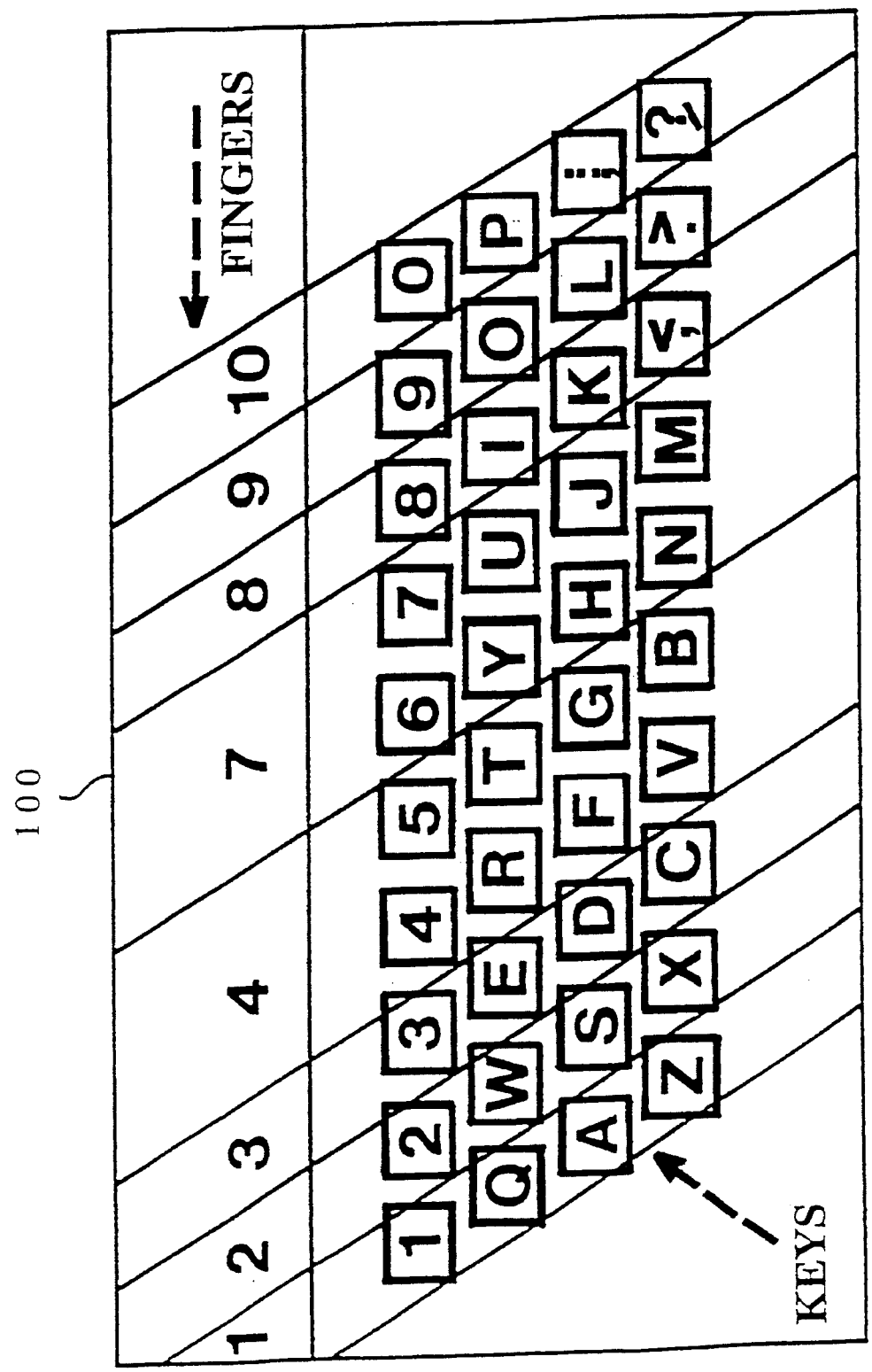
FIG. 1 is a matrix representation of the standardized keyboard (letters, numbers, and punctuation symbols)which indicates the key-finger assignment.
Figure 7:
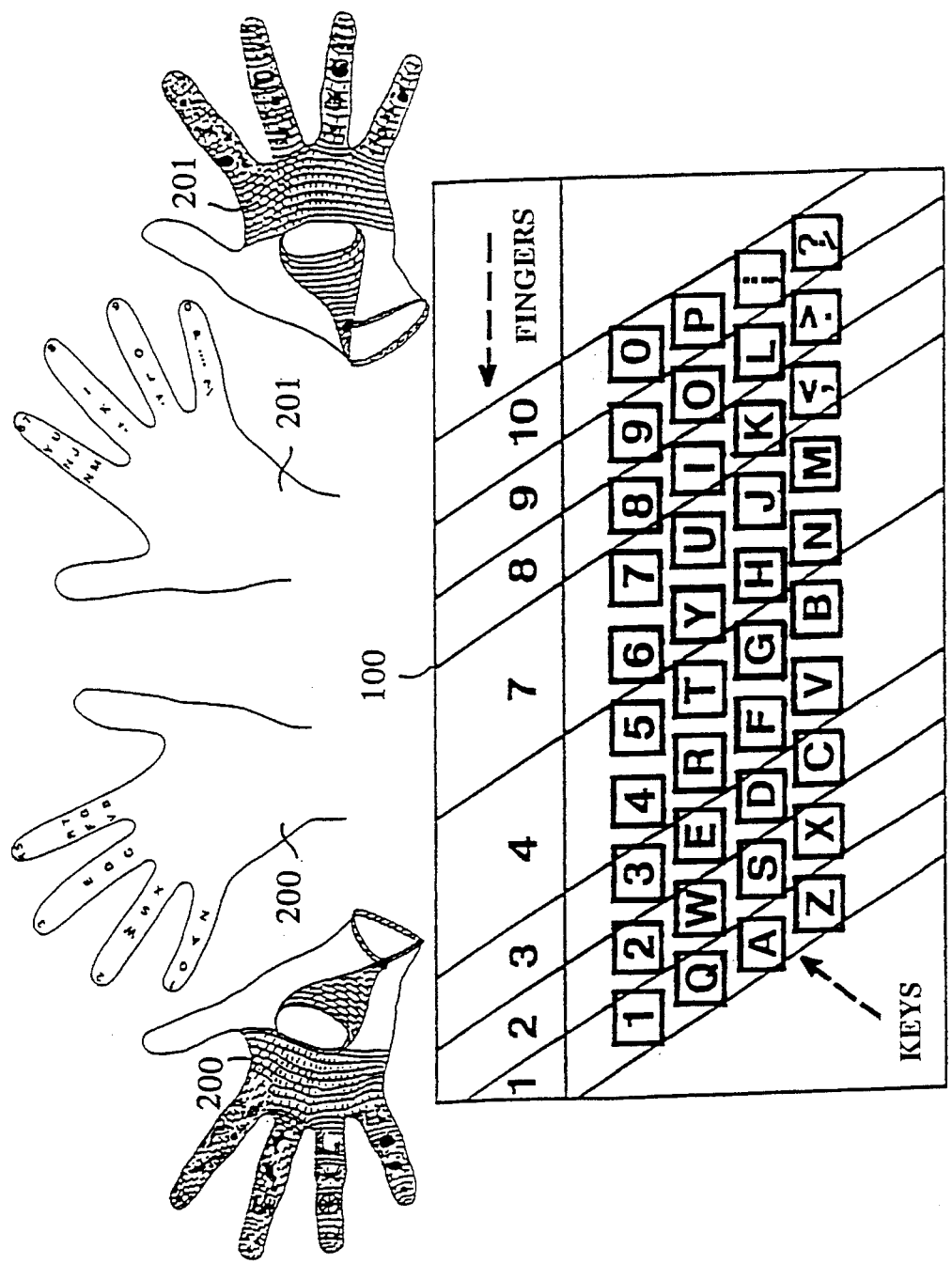
Figure 8A:
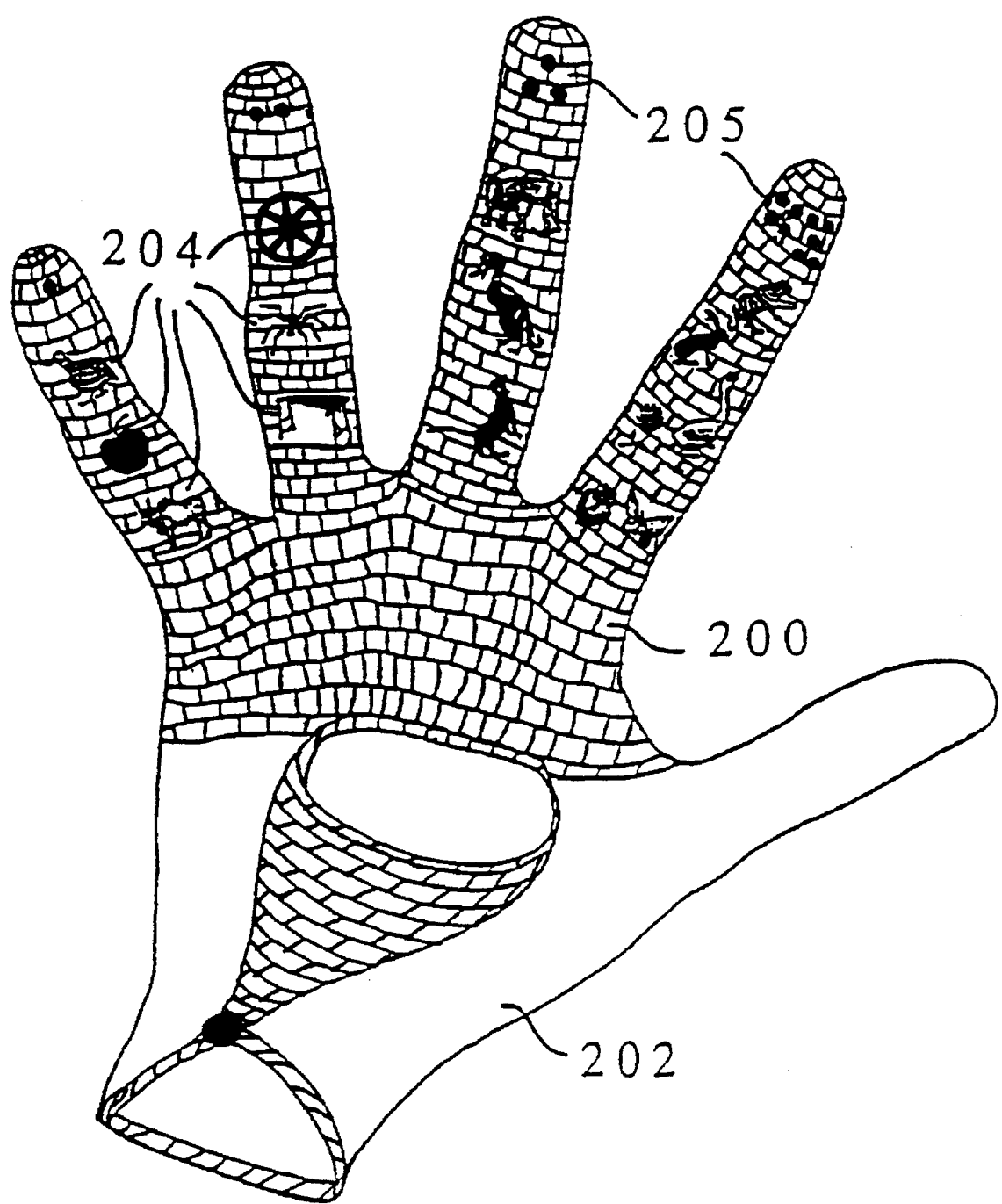
Figure 8B:
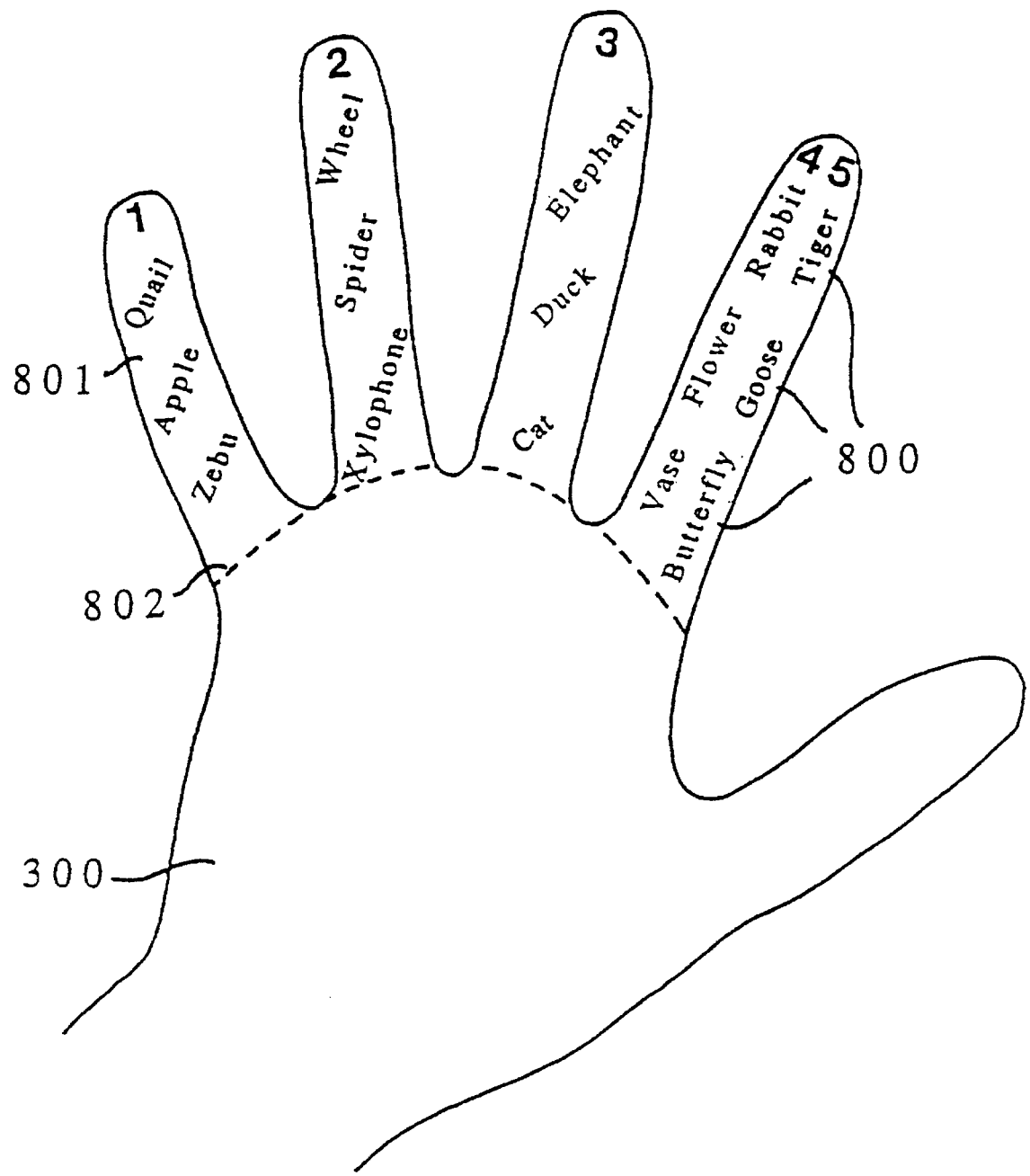
Figure 8C:
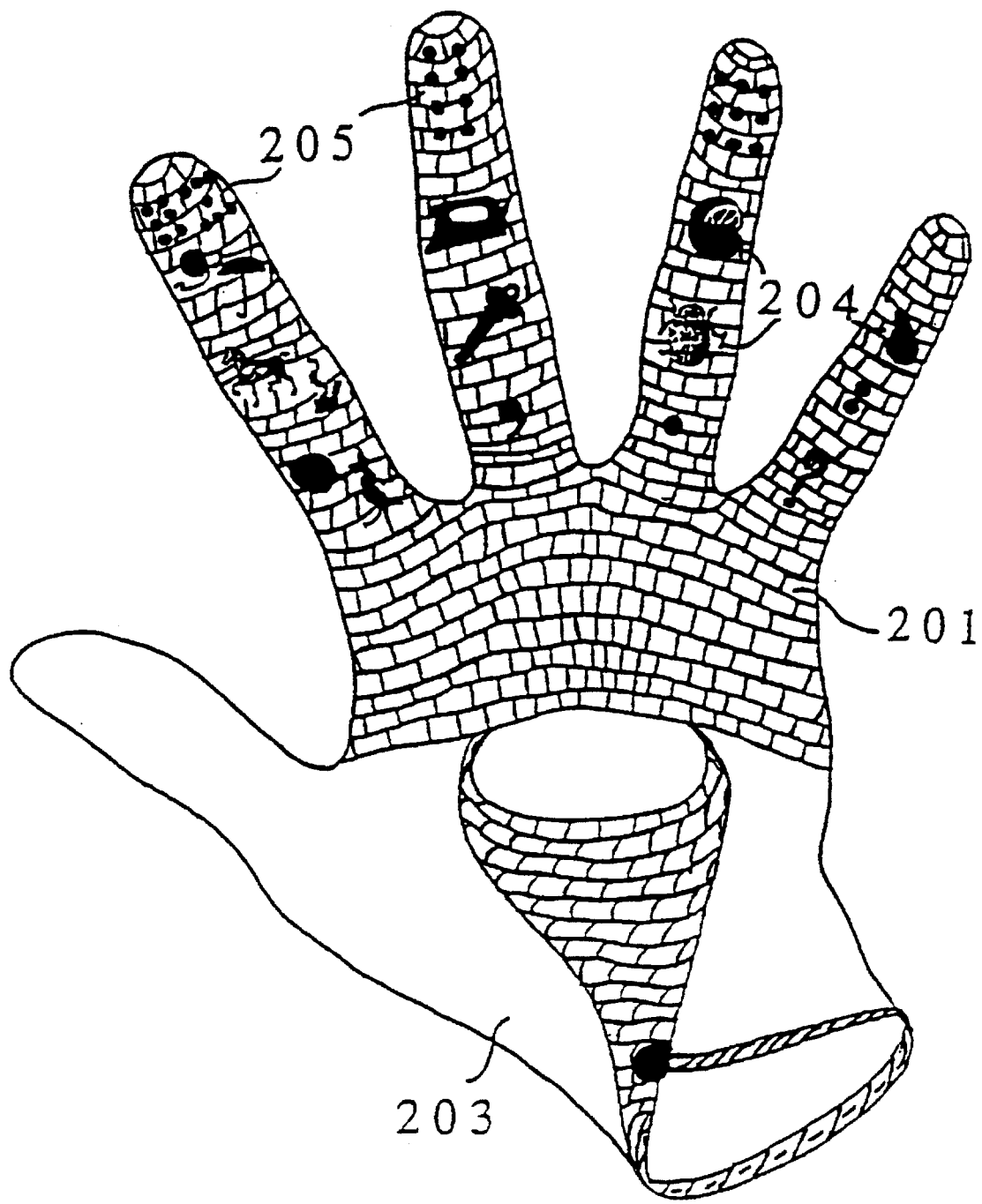
Figure 8D:
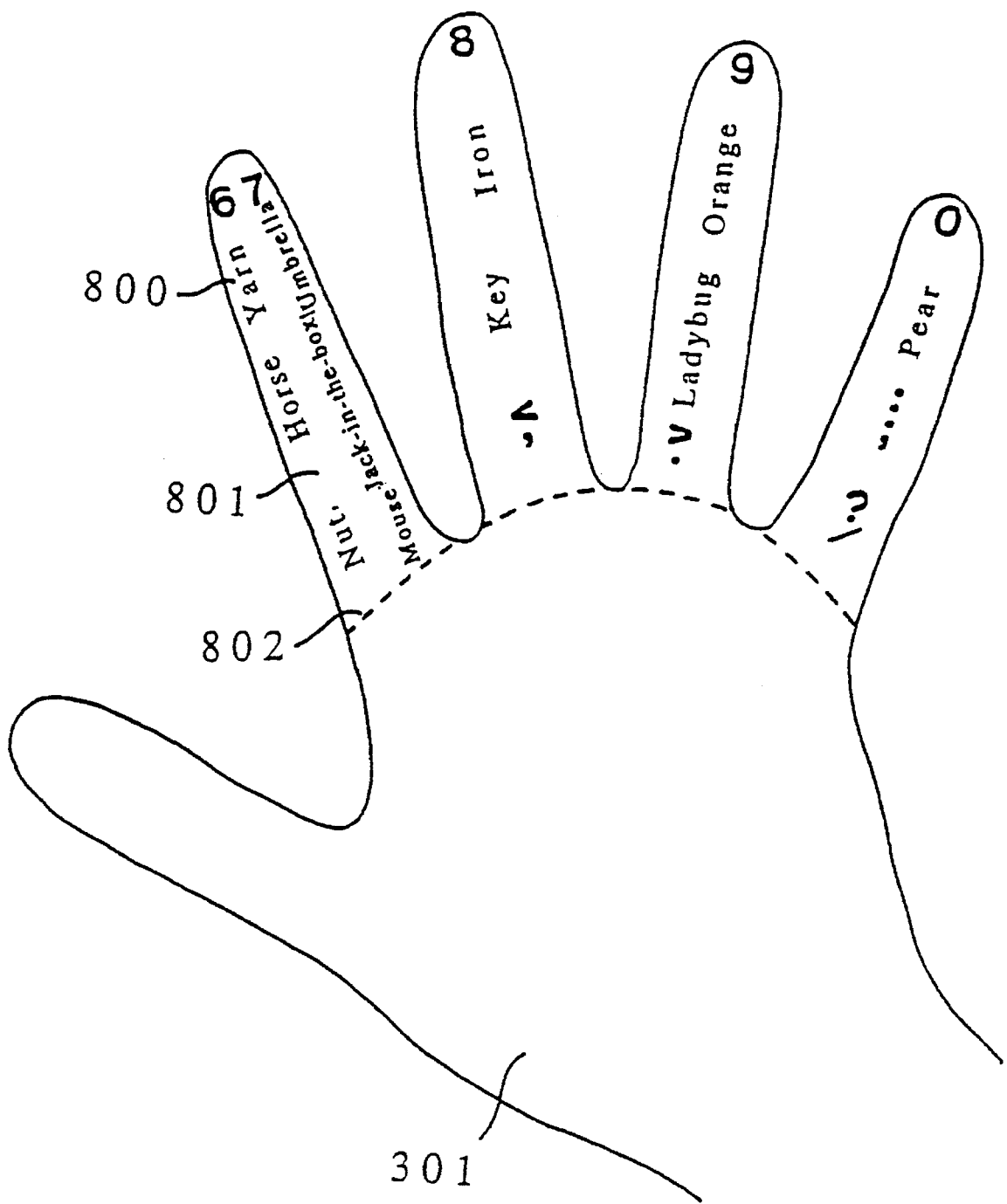
Figure 9A:
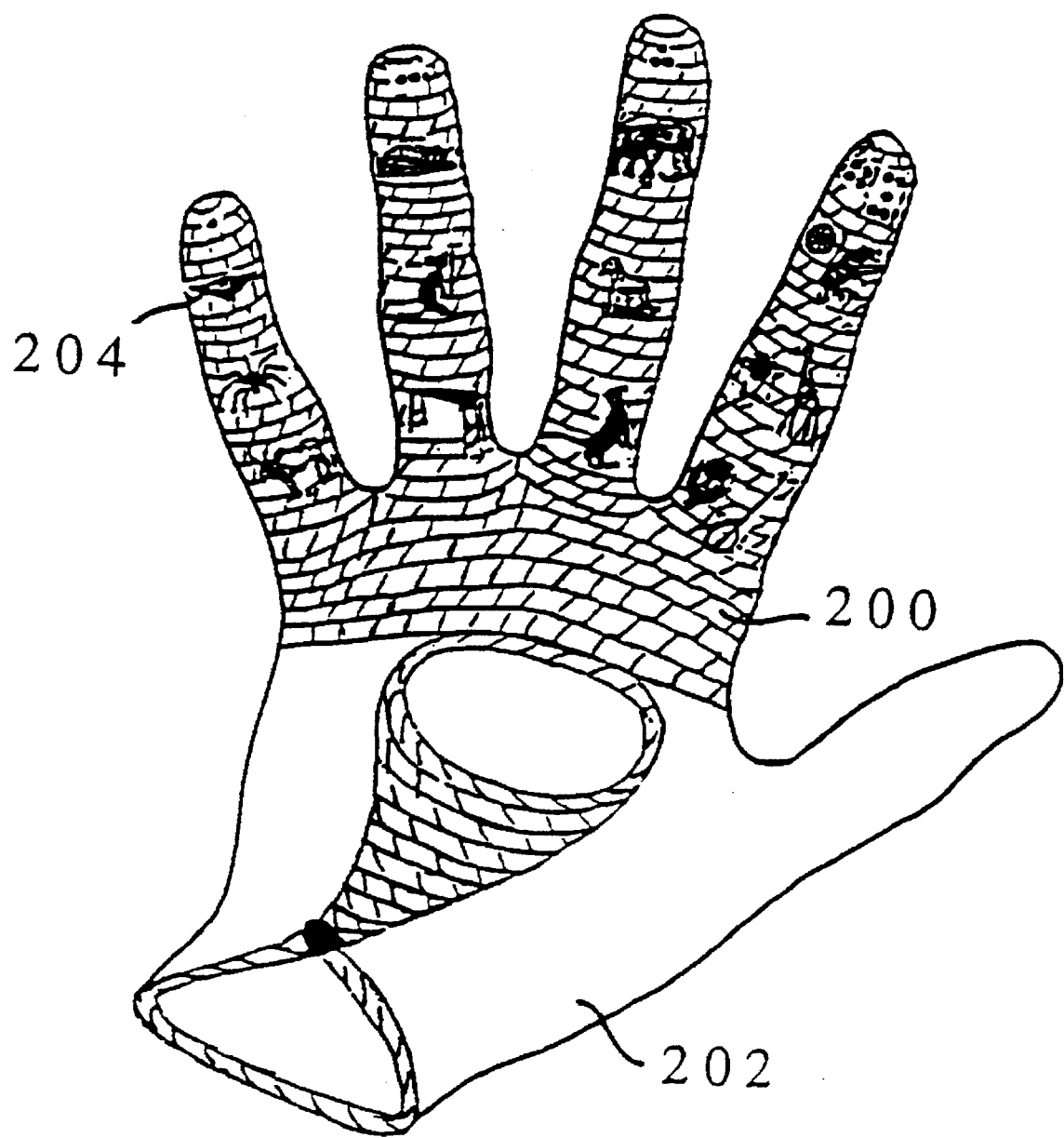
Figure 9B:
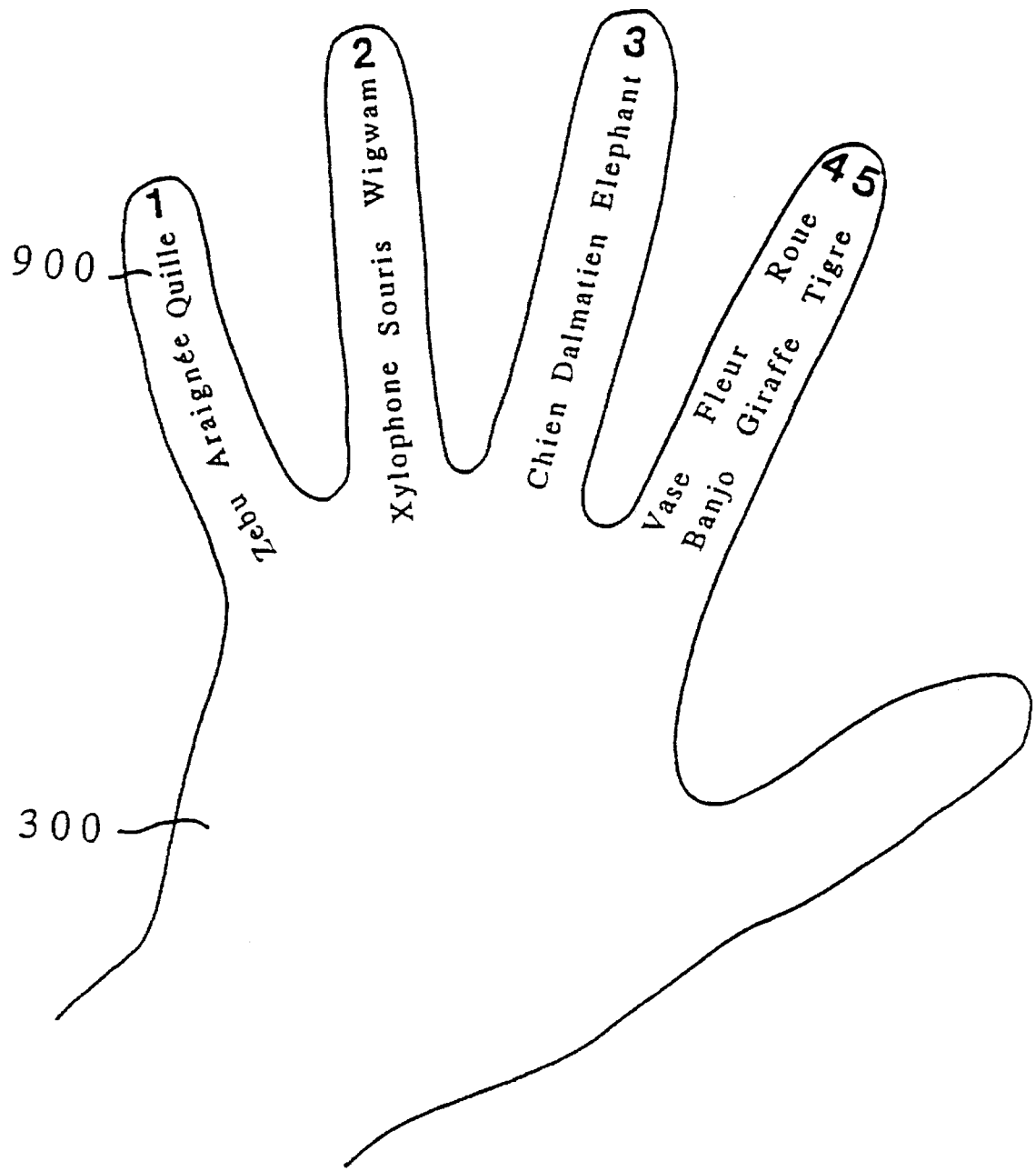
Figure 9C:
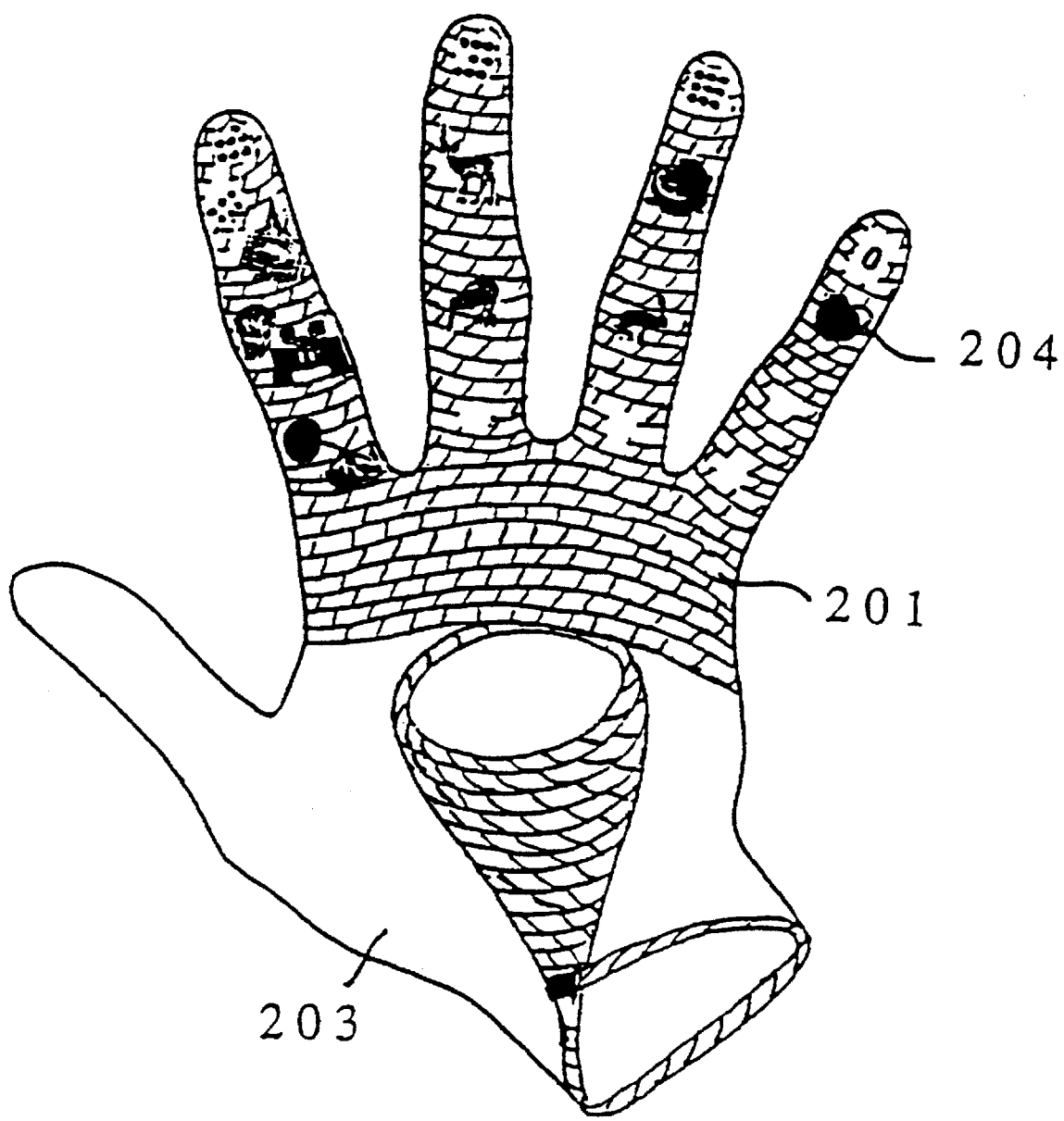
Figure 9D:
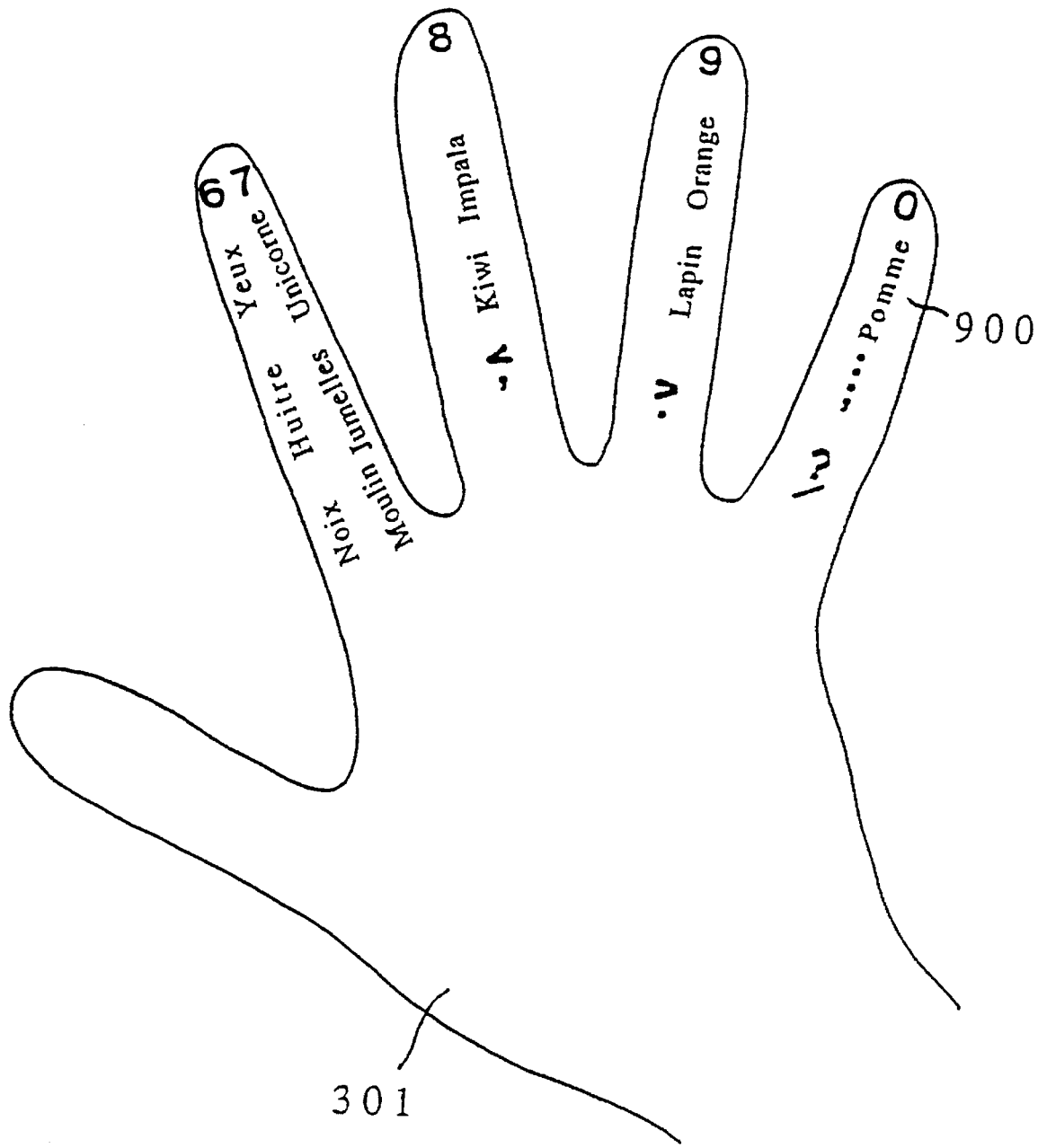
Figure 10A:
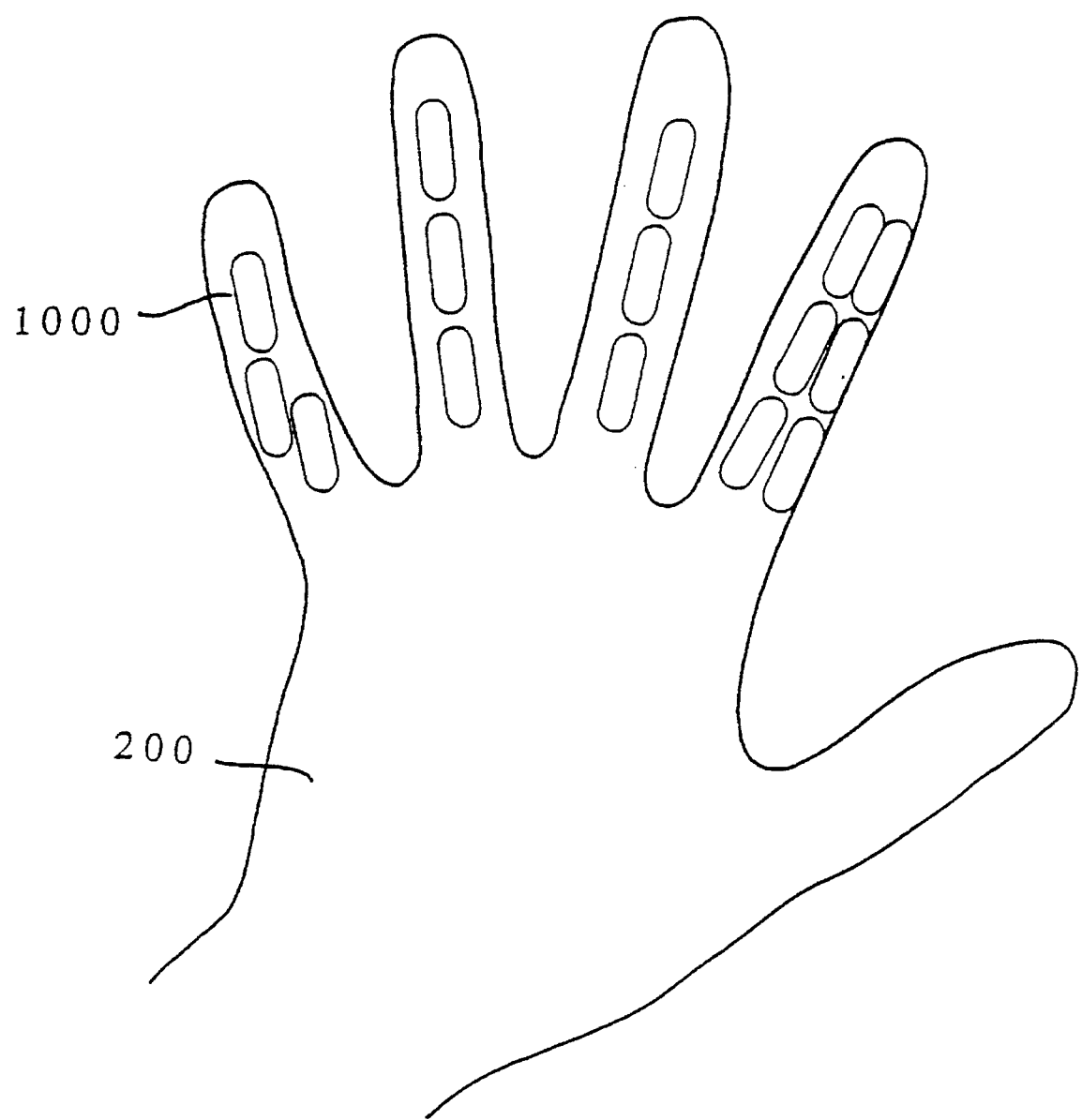
Figure 10B:
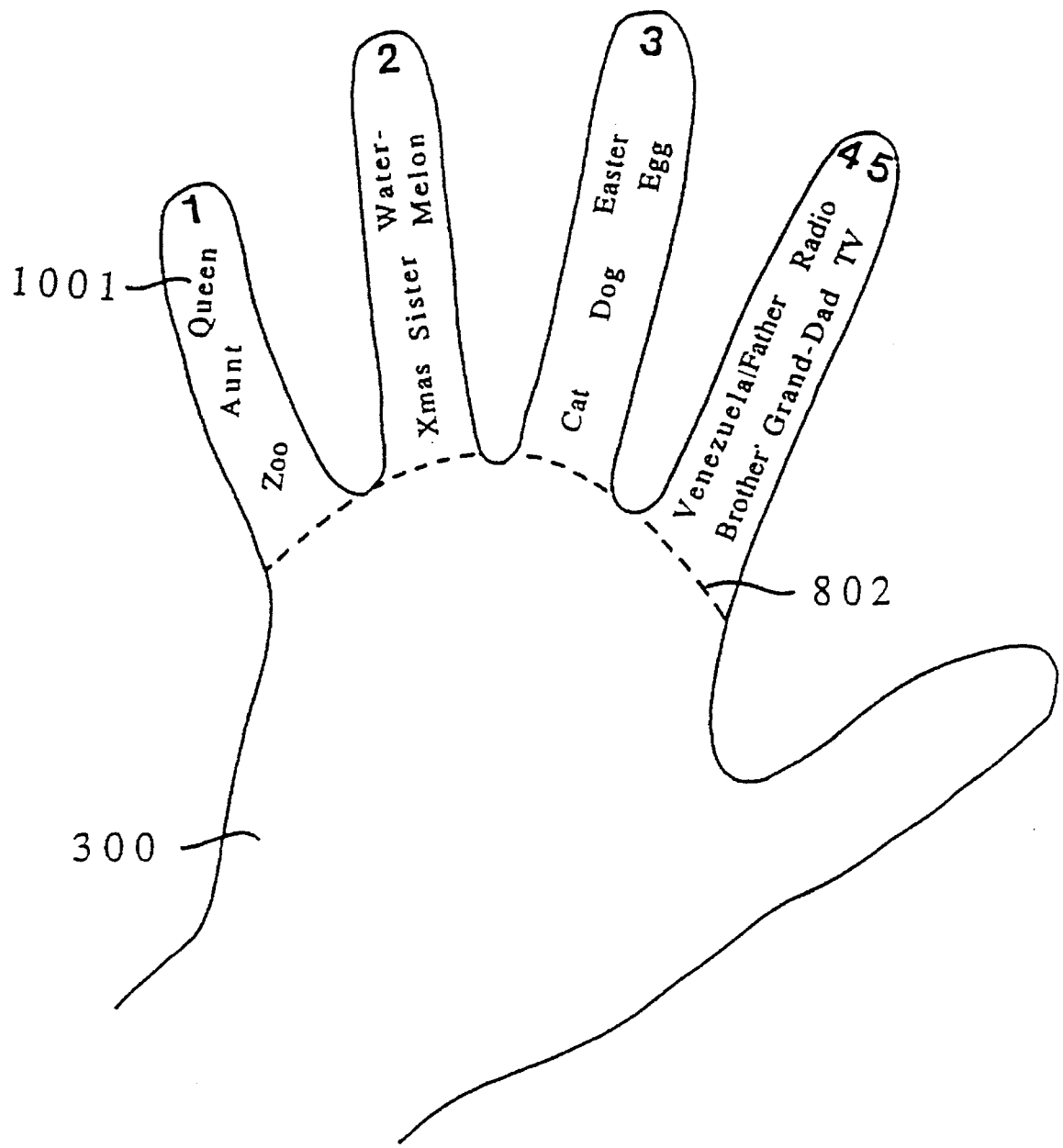
Figure 10C:
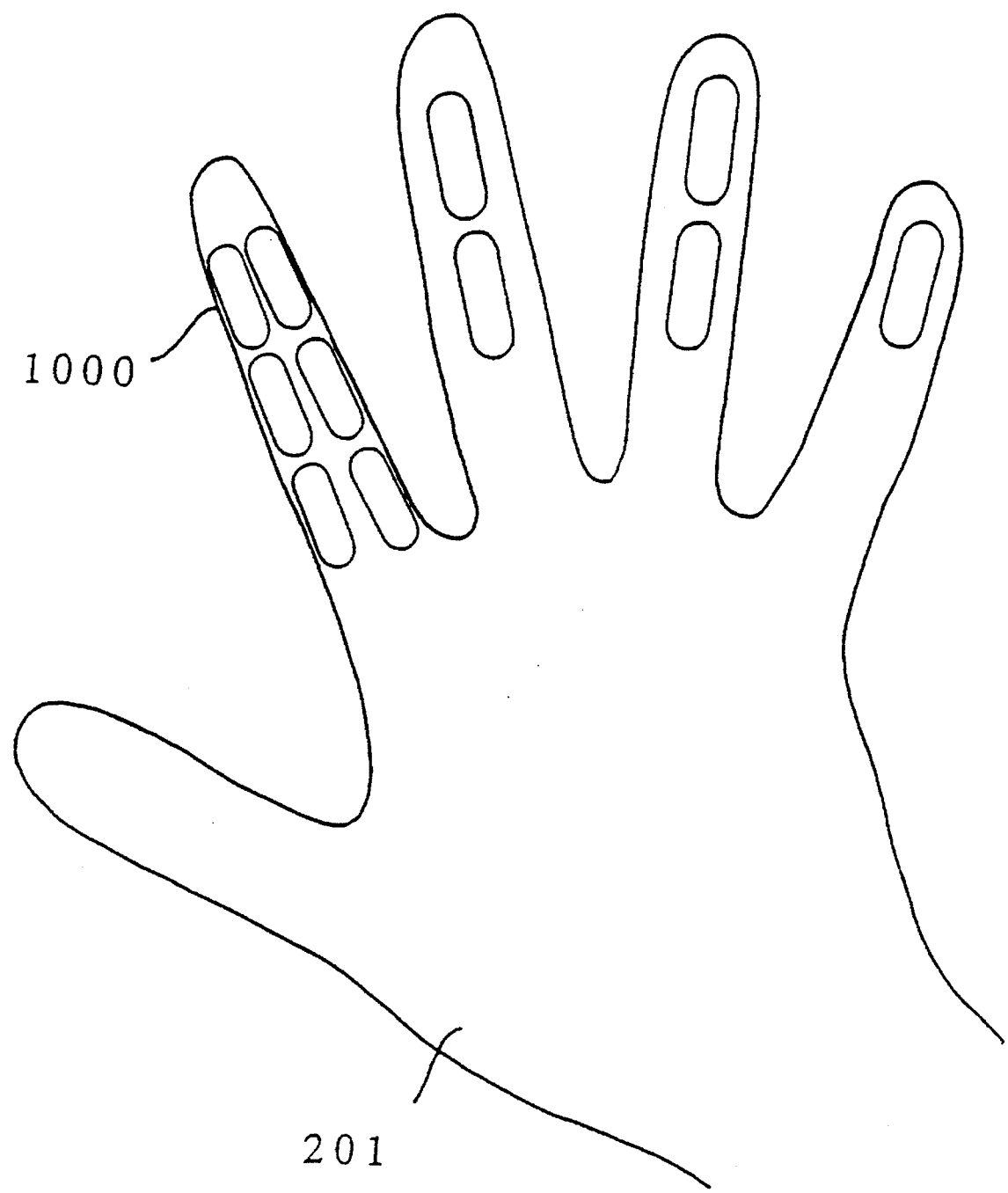
Figure 10D:
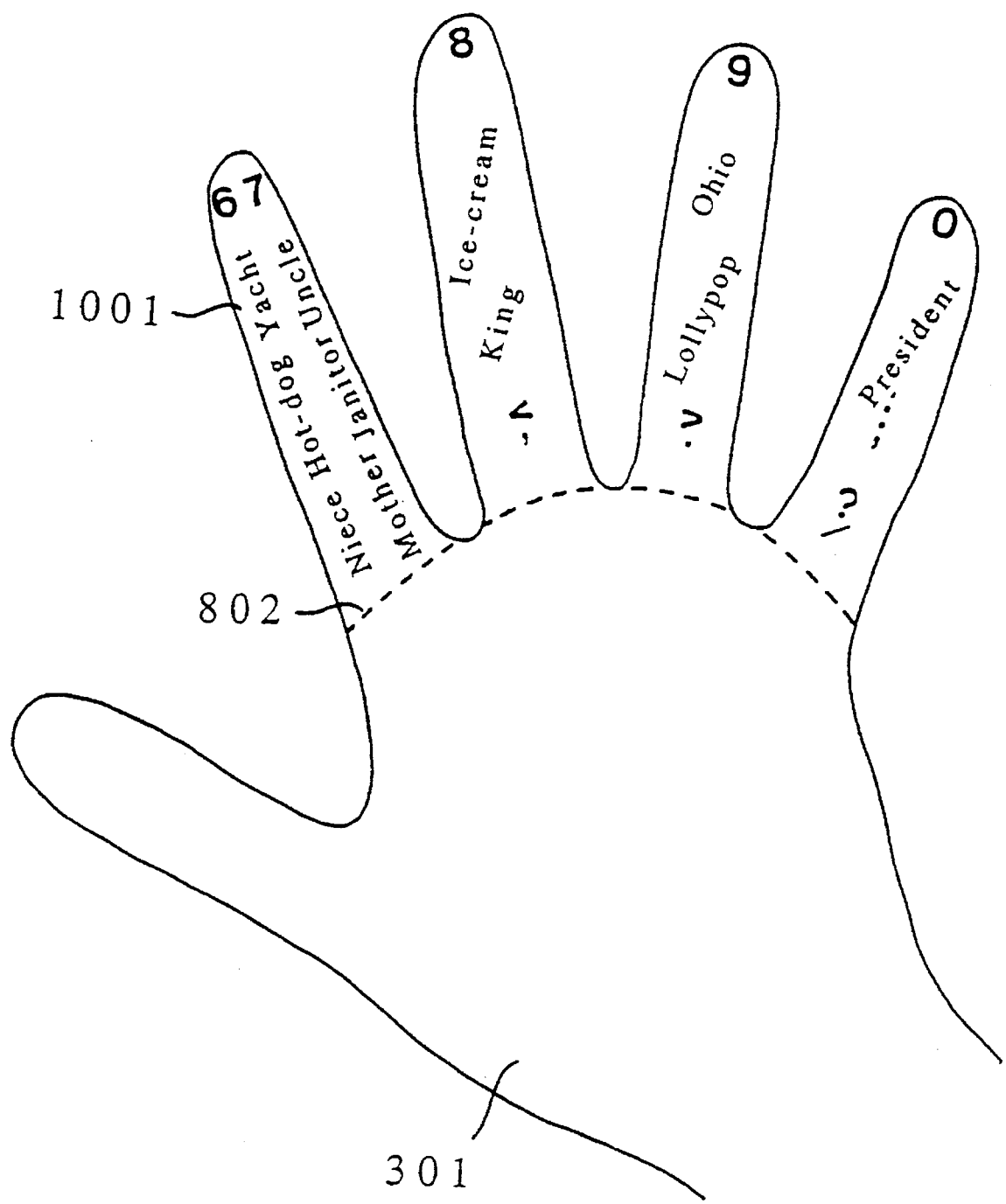

FIG. 7 depicts elevated views of the picture gloves illustrated in FIG. 2, and the alphanumeric gloves shown in FIG. 6, in relation to the representation of the standardized keyboard given in FIG. 1.

FIG. 8 depicts elevated views of gloves with inserted color-coded picture-indicia on the back portions (illustrated with a first style of gloves) and inserted picture-name-indicia on the palm portions (illustrated with a second style of gloves) for assisting in the learning of writing, spelling, and language vocabulary:

8a: back portion of a first left-hand glove with picture-indicia;

8b: palm portion of a second right-hand glove with the corresponding names in English;

8c: back portion of a first right-hand glove with picture-indicia;

8d: palm portion of a second left-hand glove with the corresponding names in English.

FIG. 9 depicts elevated views of gloves with inserted color-coded picture-indicia on the back portions (illustrated with a first style of gloves) and inserted picture-name-indicia on the palm portions (illustrated with a second style of gloves) for assisting in the learning of writing, spelling, and language vocabulary:

9a: back portion of a first left-hand glove with picture-indicia;

9b: palm portion of a second right-hand glove with the corresponding names in French;

9c: back portion of a first right-hand glove with picture-indicia;

9d: palm portion of a second left-hand glove with the corresponding names in French.

FIG. 10 depicts elevated views of gloves with inserted color-coded photo/object-indicia on the back portions, and inserted photo/object-name indicia on the palm portions for facilitating self-expression:

10a: back portion of a left-hand glove with photo/object indicia;

10b: palm portion of a right-hand glove with the names of the corresponding photo/object indicia;

10c: back portion of a right-hand glove with photo/object indicia;

10d: palm portion of a left-hand glove with the names of the corresponding photo/object indicia.

Figure 11:
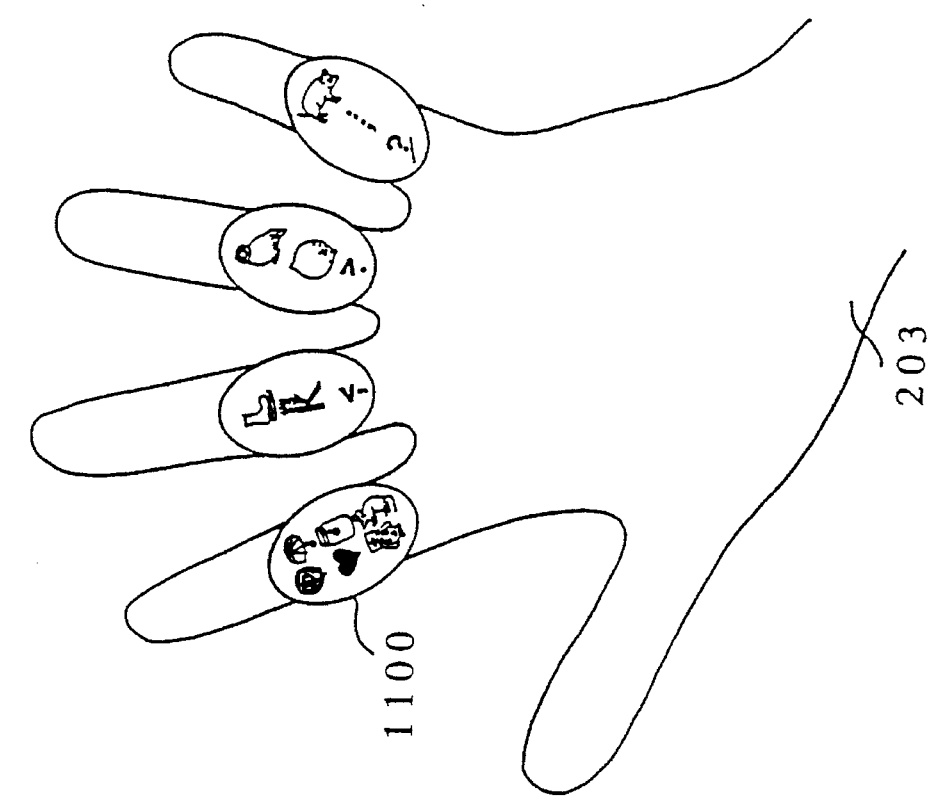
Figure 11:
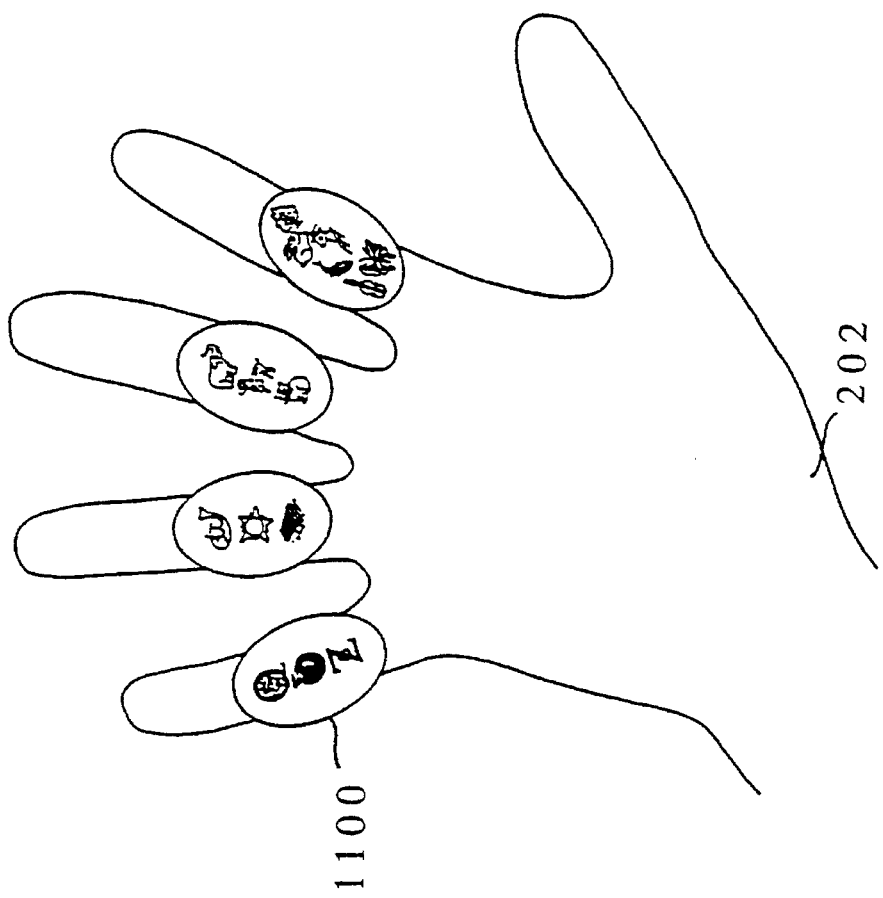

FIG. 11 depicts elevated views of a set of picture-rings worn on the hands of a teenager, for assisting the memorization of the key-finger assignment of the keyboard.

DETAILED DESCRIPTION OF THE INVENTION

In accordance with the aforementioned needs, a system is proposed for teaching which keys of the keyboard are to be struck by which fingers. The system based on gloves and rings provides a mapping of the keyboard which is to be worn accordingly onto the left hand, and the right hand. The disclosed educational devices using a process-based educational method not only account for the learner's needs and limitations in the three important stages of growth and development (i.e. pre-school age, school age, and adolescent age), but also account for the needs of today's working parents in terms of lack of time, money, and energy in dealing with the education of their children.

Pre-School Age Group

First Phase: Picture Gloves.

Although the pre-school child has not yet learned his alphabet, he is very receptive to associations between images and spoken words. This receptivity is the basis for providing the pre-school child with a pair of gloves carrying a series of images on their four left/right fingers. The spatial distribution of the images on the four fingers of each glove is determined as follows. The position of an image on a glove matches the position of the key of the keyboard which bears the initial letter of the (spoken) word representing the said image. This procedure is explained in detail by comparing the standardized keyboard 100 of FIG. 1 with the drawings of the left-hand glove 200 and right-hand glove 201 in FIG. 2a and FIG. 2b, worn on the left hand 202 and the right hand 203 of a user respectively.

Figure 2A:
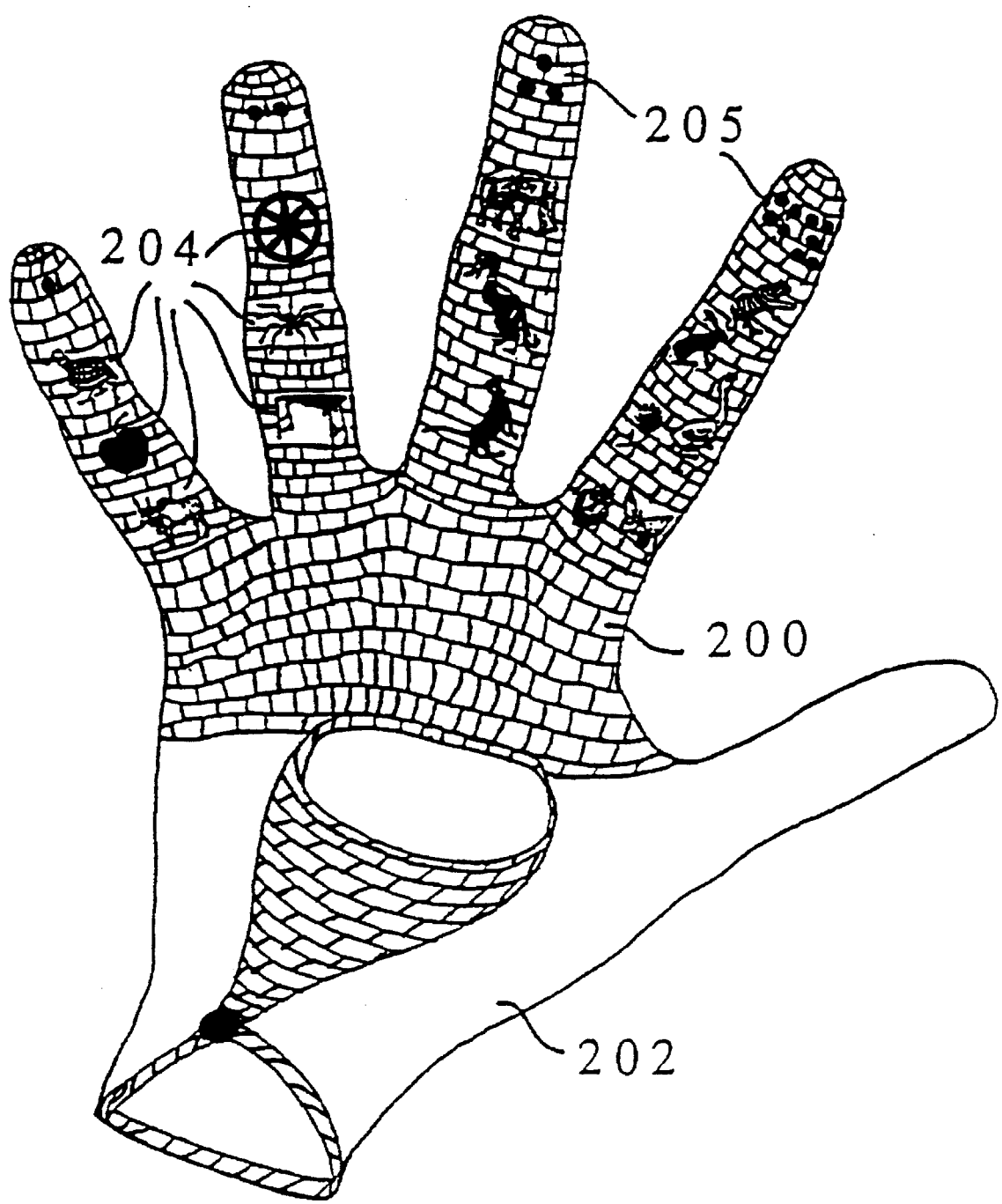
FIG. 2 depicts elevated views of the back-portion of picture gloves with color-coded fingers.

In FIG. 2a, the little finger carries from bottom-to-top the pictures 204 of a "Zebu", an "Apple", and a "Quail"; thus matching the series of letters "ZAQ" of the first column in FIG. 1. The second finger carries the pictures 204 of a "Xylophone", a "Spider", and a "Wheel"; thus matching the series of letters "XSW" of the second column of FIG. 1. The third finger carries the pictures of a "Cat", a "Duck", and an "Elephant"; thus matching the series of letters "CDE" of the third column of FIG. 1. The fourth finger carries two series of pictures slightly shifted from each other. The series of pictures that are shifted to the left is a "Vase", a "Flower", and a "Rabbit"; thus matching the series of letters "VFR" of the fourth column in FIG. 1. The other series of pictures (shifted to the right) is a "Butterfly", a "Goose", and a "Tiger"; thus matching the series of letters "BGT" of the fifth column in FIG. 1. Therefore, the lefthand picture-glove also identifies the correspondence between left-hand fingers and the columns of the keyboard: little finger strikes column 1, second finger strikes column 2, third finger strikes column 3, fourth finger strikes columns 4 and 5. This finger/column association can be reinforced during training by color-coding the keys of the keyboard 100 to match the four different colors of the four fingers of the left-hand glove 200, which would have to be standardized. For example in FIG. 2a, the choice of colors is pink for the little finger, red for the second finger, green for the third finger, and yellow and orange for the fourth finger.

The tip of each finger of the left-hand picture glove 200 in FIG. 2a shows a cluster of black dots 205. The number of dots 205 in each cluster is chosen to coincide with the number printed on the matching key of the keyboard. The single dot on the little finger matches number "1" on the upper key in column 1 of FIG. 1. The two dots on the second finger tip match number "2" on the upper key in column 2 of FIG. 1. The three dots on the third finger tip match number "3" on the upper key in column 3 of FIG. 1. The fourth finger tip of the left glove shows two clusters of dots that are slightly shifted. The cluster shifted to the left has four dots to match number "4" on the upper key of column 4 in FIG. 1, whereas the cluster shifted to the right has five dots to match number "5" on the upper key of column 5 in FIG. 1. This structure is beneficial to the education of the pre-school child age group. First, it will help the child to learn how to count on the fingers of his hands while becoming familiar with the concept of symbol or abstract representation. Second, he will learn how to do that by associating each number with the finger that will be used later to strike the matching key on the keyboard.

Figure 2B:
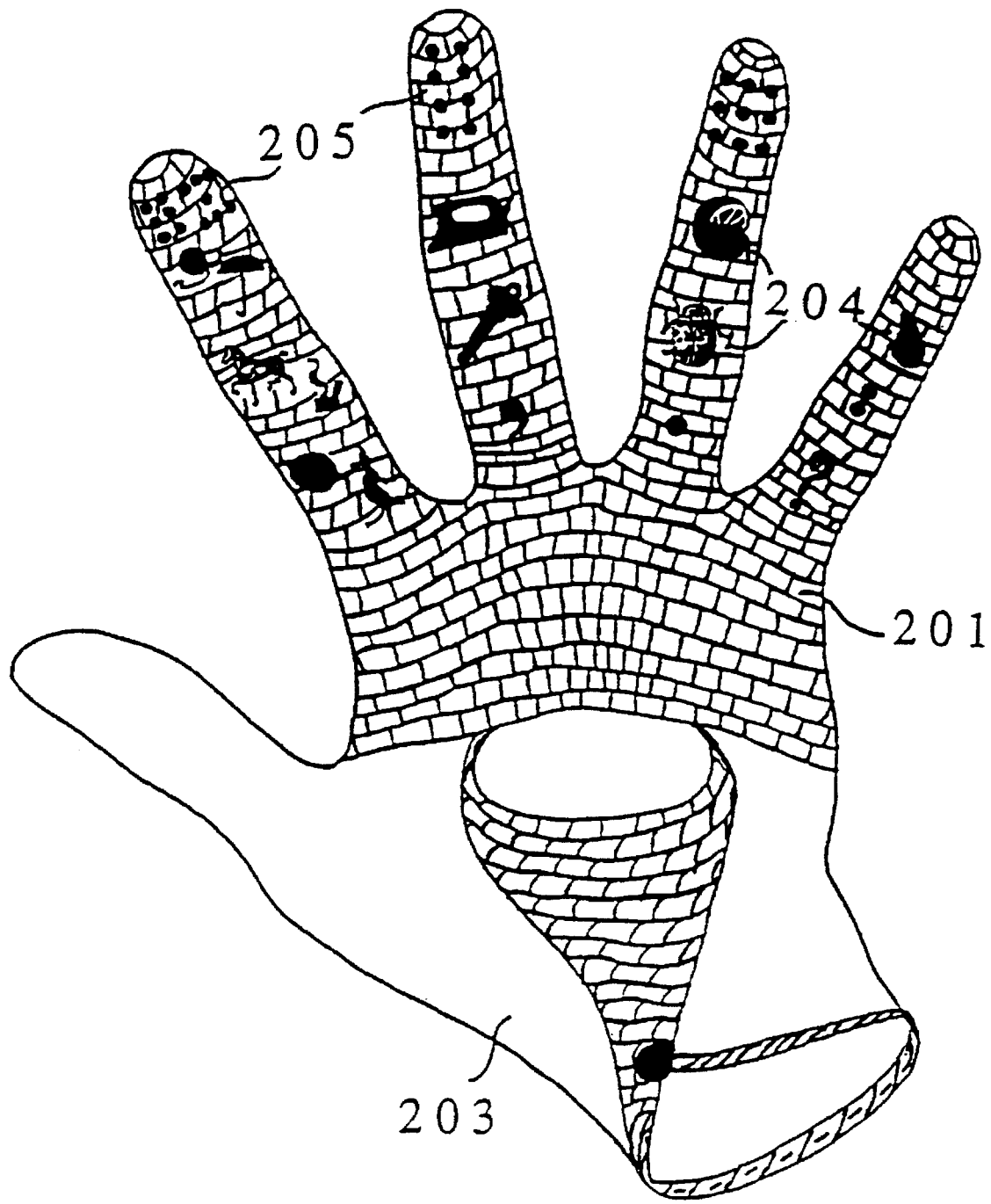

The functional role of the right-hand picture-glove 201 depicted in FIG. 2b is the same as above. The little finger shows a "Pear" 204, matching the "P" key of the 10th column of FIG. 1; the second finger shows a "Ladybug" 204 and an "Orange" 204, matching the "LO" keys of the 9th column; the third finger shows a "Key" and an "Iron", matching the "KI" keys of the 8th column; the fourth finger shows a "Mouse", a "Jack-in-the-box", and an "Umbrella" (shifted right), and a "Nut", a "Horse", and "Yarn" (shifted left), matching the "MJU" keys of the 7th column and the "NHY" keys of column 6 in FIG. 1. The association between fingers and keyboard columns is reinforced by color-coding the little finger in pink, the second finger in red, the third finger in green, and the fourth finger in yellow and orange.

Like with the left-hand glove 200, the finger tips of the right-hand glove 201 show clusters of black dots 205 to symbolize the number printed on the matching keys of the keyboard 100. The little finger tip shows the number "0" itself to match the upper key of column 10 in FIG. 1. The nine dots on the second finger tip match number "9" on the upper key of column 9 in FIG. 1. The eight dots on the third finger tip match number "8" on the upper key of column 8 in FIG. 1. The fourth finger tip shows two clusters of black dots slightly shifted from each other. The right-shifted cluster has seven dots, and matches number "7" on the upper key of column 7 in FIG. I, whereas the six dots of the left-shifted cluster match number "6" on the upper key of column 6 in FIG. 1.

By construction, the choice of images 204 of the picture gloves 200 & 201 is clearly not unique, and by no means restricted to the choice given in FIG. 2a and FIG. 2b. In FIG. 2a for example, one could choose the picture 204 of a "Queen" instead of a "Quail". The only requirement is that the initial letter of the word representing the picture matches the key which occupies the same position, as illustrated above. Nevertheless, because of the associative nature of the memorizing process, enhanced memorization performance will result from choosing pictures which share some common features, and which are most appropriate to the age of each small child. For example, at an age when the child discovers the fairy tale of Snow-White, a pertinent choice for the pictures 204 on the little finger of the left-hand could be a meanlooking "Queen", an "Apple", and the "Zees" of Snow-White lying on her bed, plunged in a deep sleep after eating the cursed apple given to her by the mean queen. Such a pictorial representation of Snow-White's fairy tale would take definite advantage of the child's driving-time[3], and enhance visual memorization by the child.

[3]Brodey, M. W.: "Information Exchange In The Time-Domain", 122nd Annual Meeting of the Psychiatric Association, Atlantic City, N.J., May 9th–13th, 1966.

Such picture correlations towards enhanced visual memorization can be need-adaptively implemented throughout the child's growth. During early childhood for example, the child could wear picture gloves illustrating family relationship. As the child grows older, he could wear picture gloves with more emphasis on cultural or social content for example. Picture gloves could thus be manufactured according to a certain theme, following the procedure described above and using screen-printing or "decal" technologies that are known to be safe for the very young children. A cost-effective alternative to having multiple pairs of gloves is proposed as a single pair of gloves with removable pictures. For older children, the latter structure would be done by printing on the glove VELCRO bases instead of pictures. VELCRO is a registered trademark for hook and loop fasteners which are manufactured by Velcro, Inc., of Manchester, N.H. Such fasteners are well-known in the art and comprise a plurality of small hooks affixed to one surface and a plurality of complementary loops affixed to another surface. The pictures would be separate entities with a VELCRO back that could be easily attached on, or removed from, the complementary VELCRO base of the gloves. Letters matching the keys of the keyboard should be printed on the proper VELCRO bases of the gloves. This would indicate unambiguously where to put the pictures on the gloves in accordance with the touch-typing/training procedure described above. As another alternative, the pictures could also be mounted on flexible labels that would be inserted within transparent covers permanently mounted on each one of the four fingers of each hand. Such a transparent cover could be made of plastic, or knitted laces, depending on the structure of the gloves. Of course, proper setting of such need-adaptive picture gloves would require close supervision of the child by an adult.

For safety, economy, comfort, and beauty purposes, the picture gloves can be made of cotton, or any kind of see-through material. They can also be crocheted out of cotton. When crocheted, the picture gloves are stretchable, so that a pair of gloves can be worn by children with hands of different size, or by the same child during his pre-school growth. Besides this economical advantage, crocheted cotton provides comfort by not retaining sweat on the fingers, but instead letting the skin breath openly. In winter time however, picture gloves that cover entirely the hands may be needed when the child is playing outside.

In summary, these pedagogical picture gloves are:

1) convenient and functional;

2) safe and comfortable;

3) fun and unique;

4) colorful and attractive;

5) fundamental to learning;

6) cost-effective.

Second Phase: Alphanumeric/Picture Gloves.

Figure 3A:
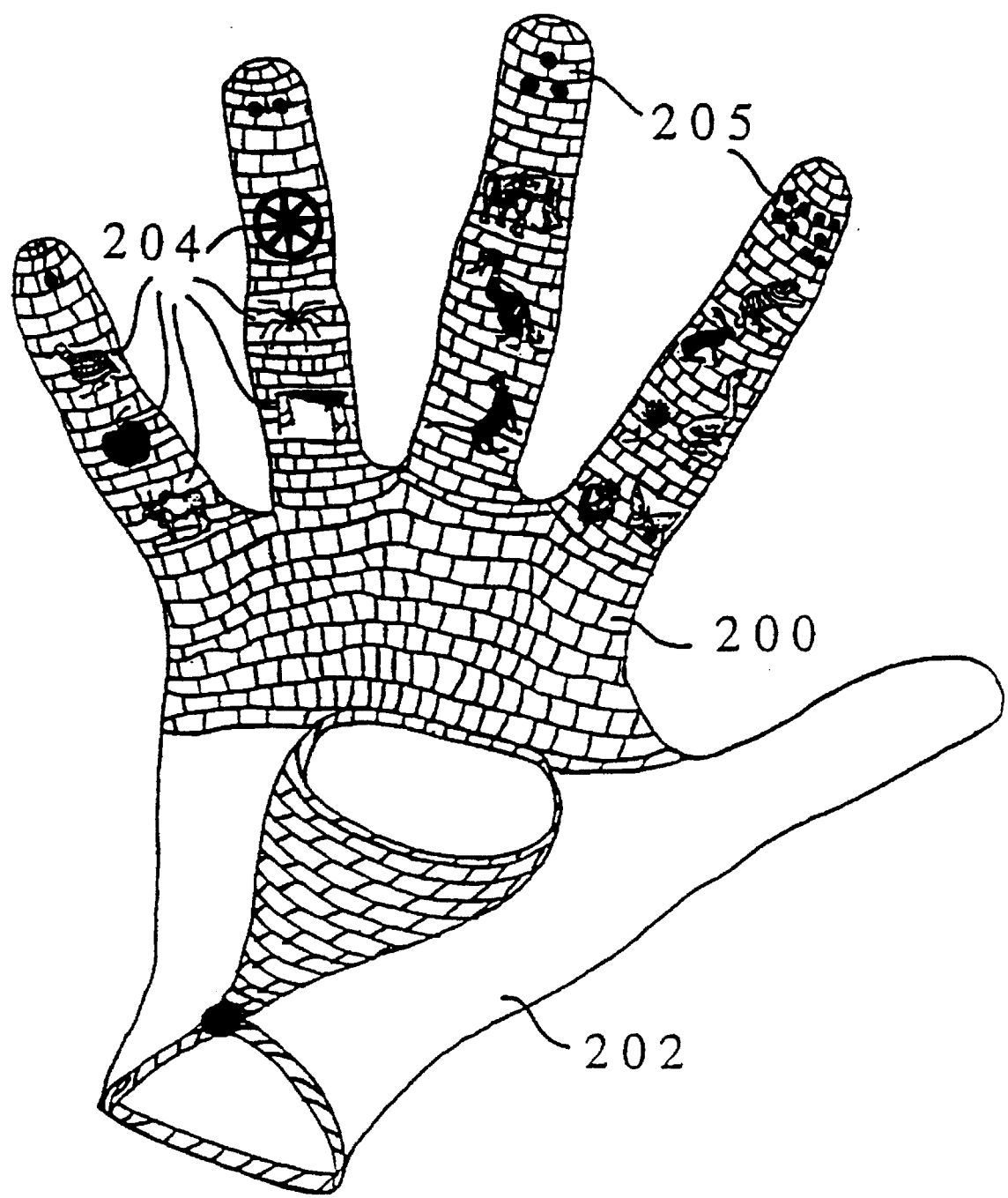
Figure 3B:
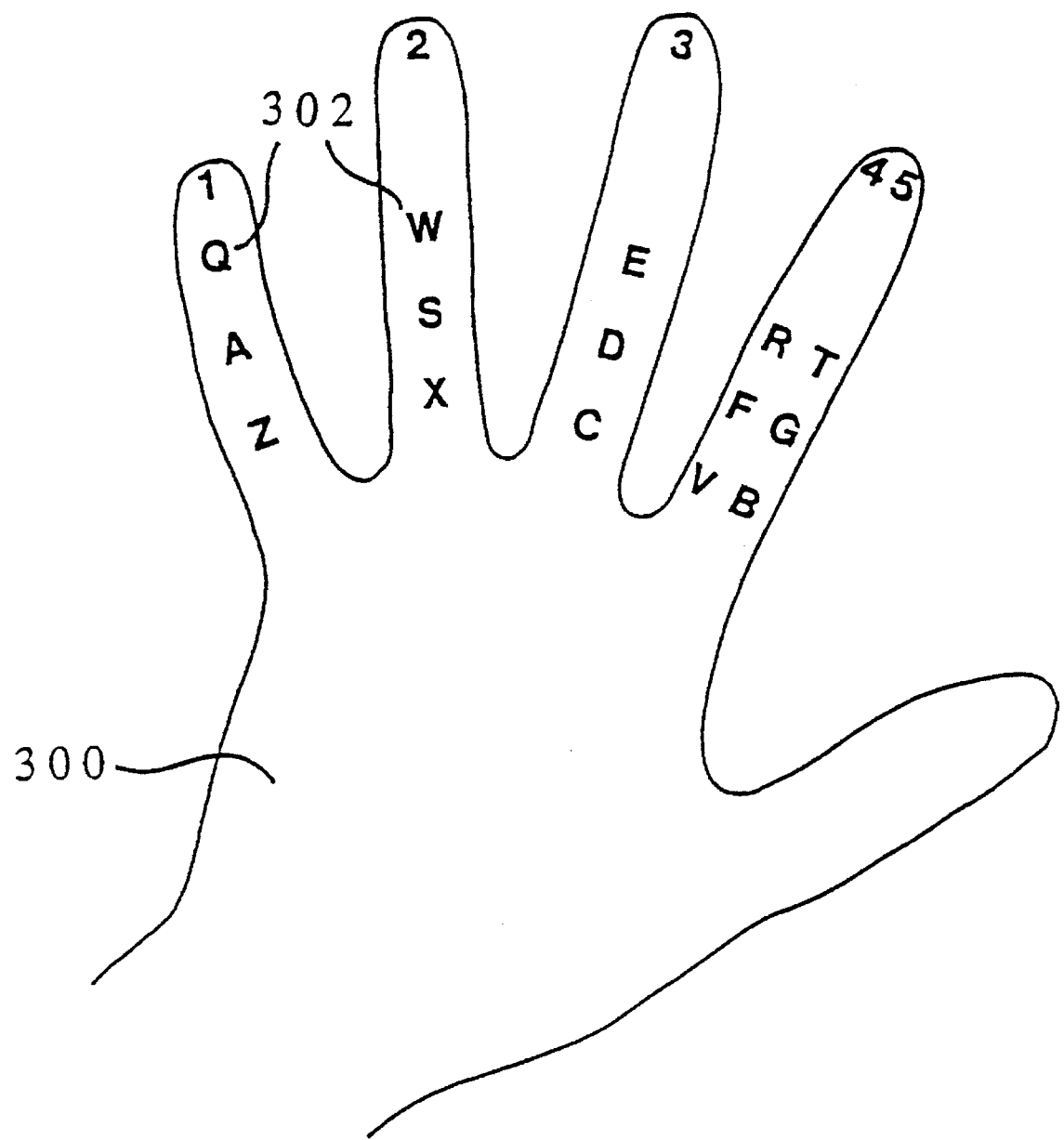
Figure 3C:
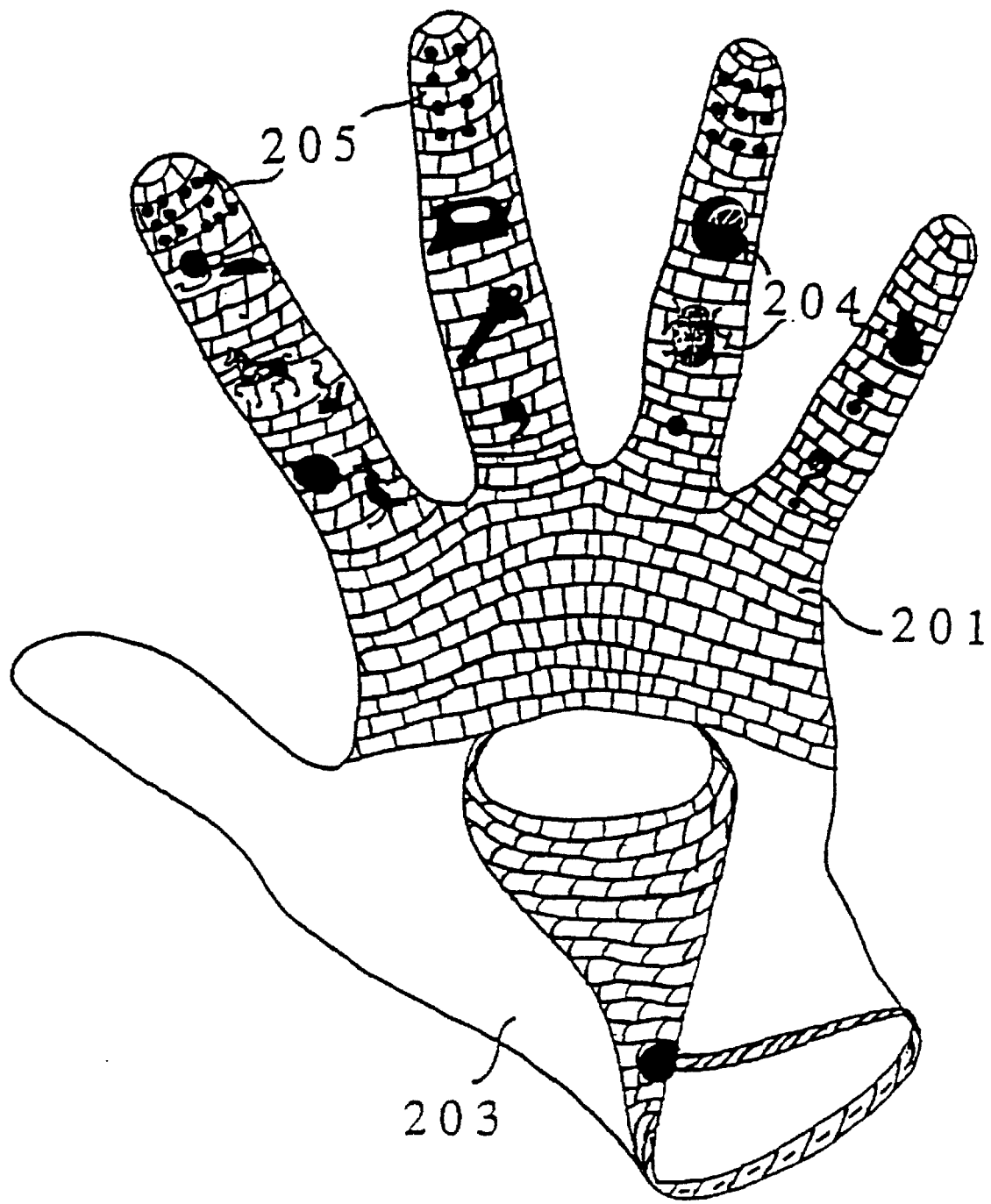
Figure 3D:
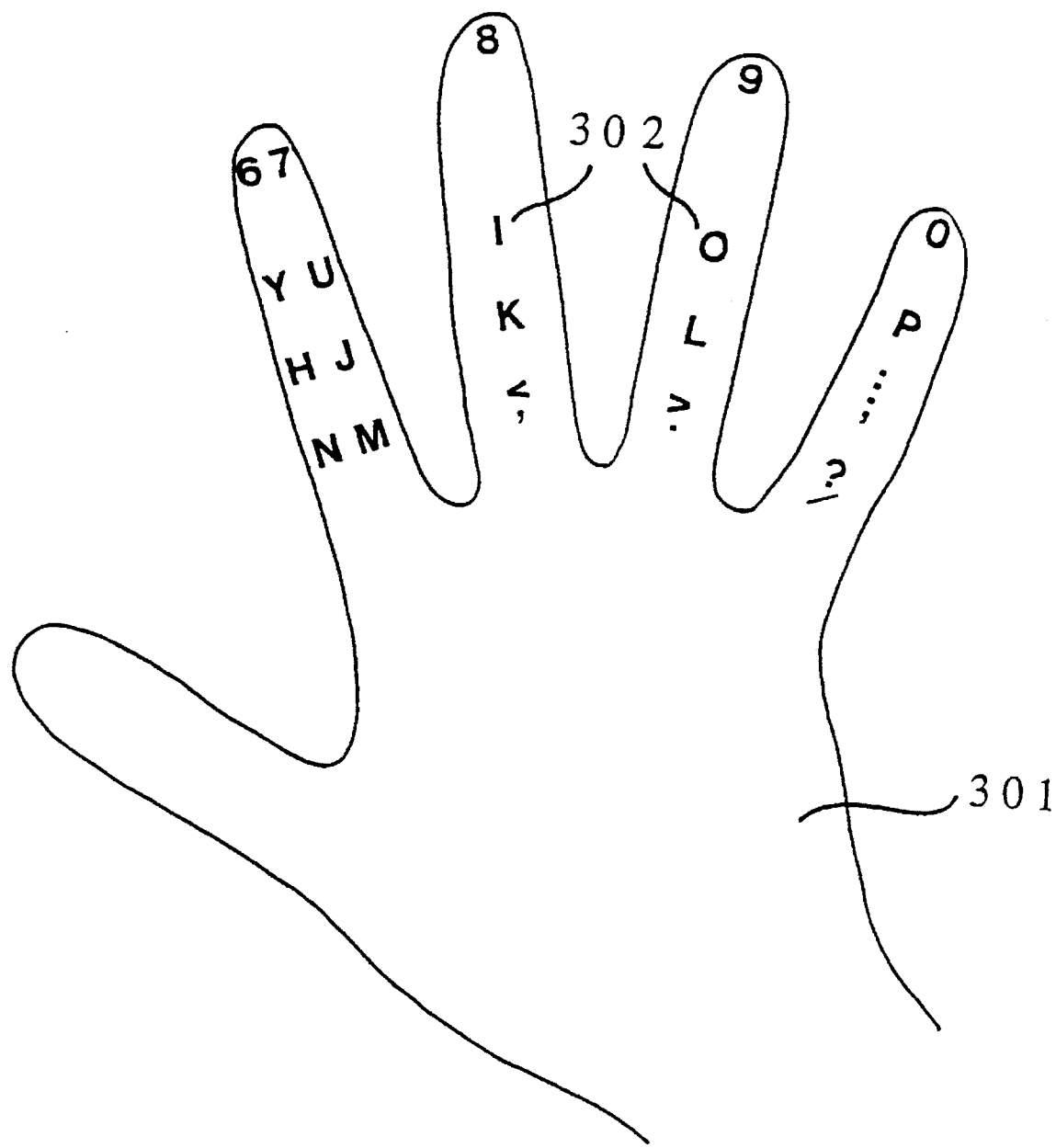
Figure 4A:
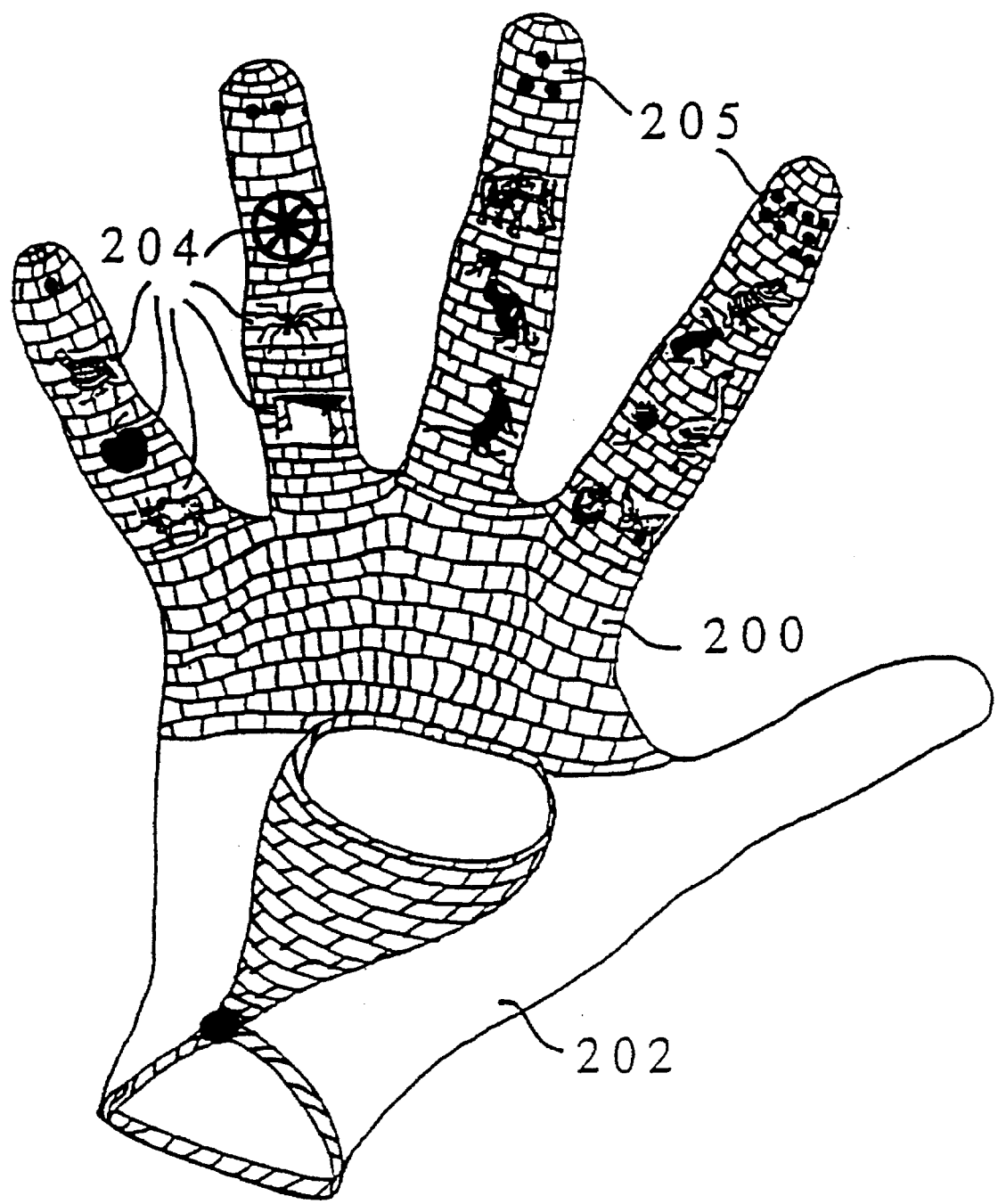
Figure 4B:
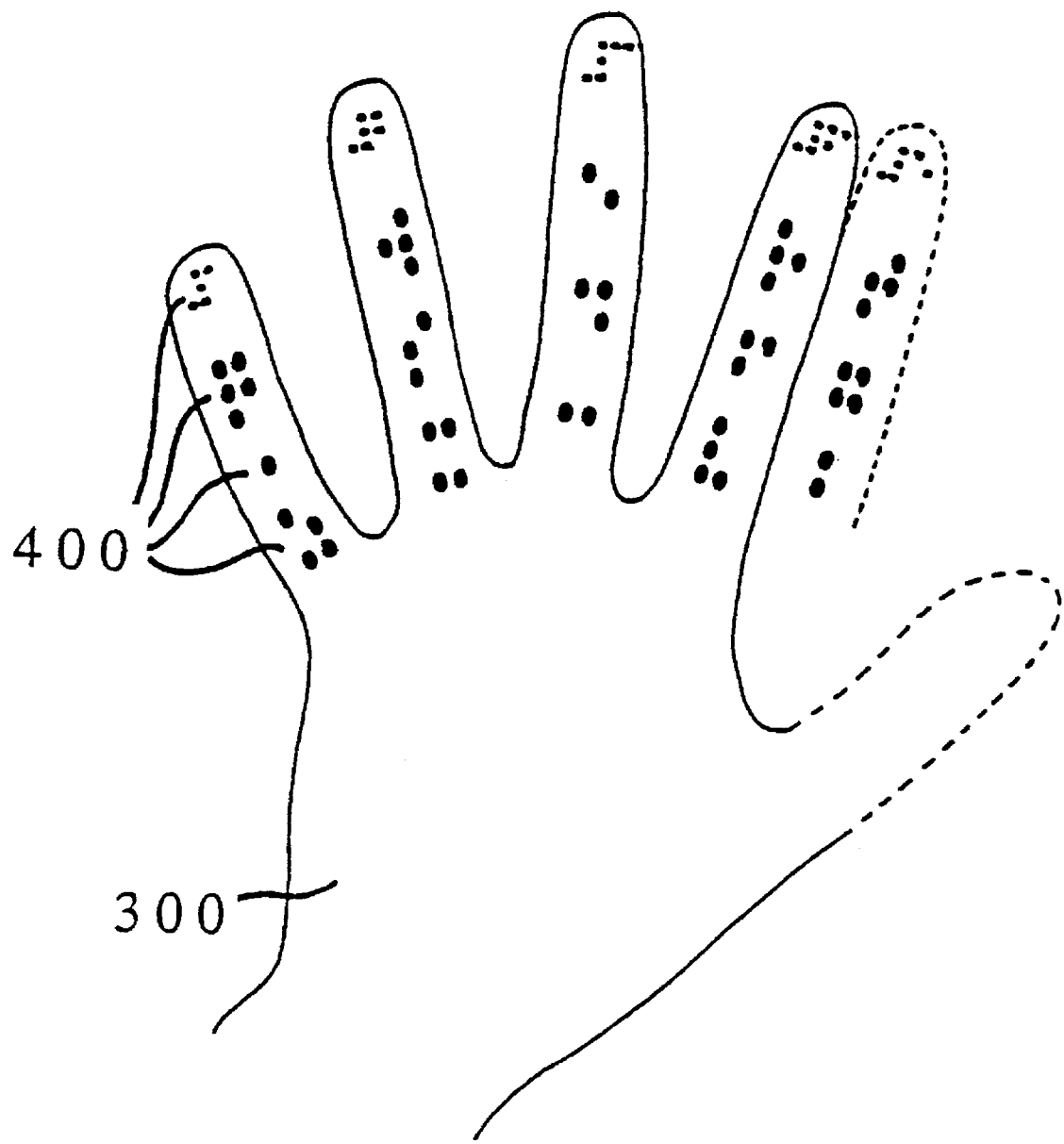
Figure 4C:
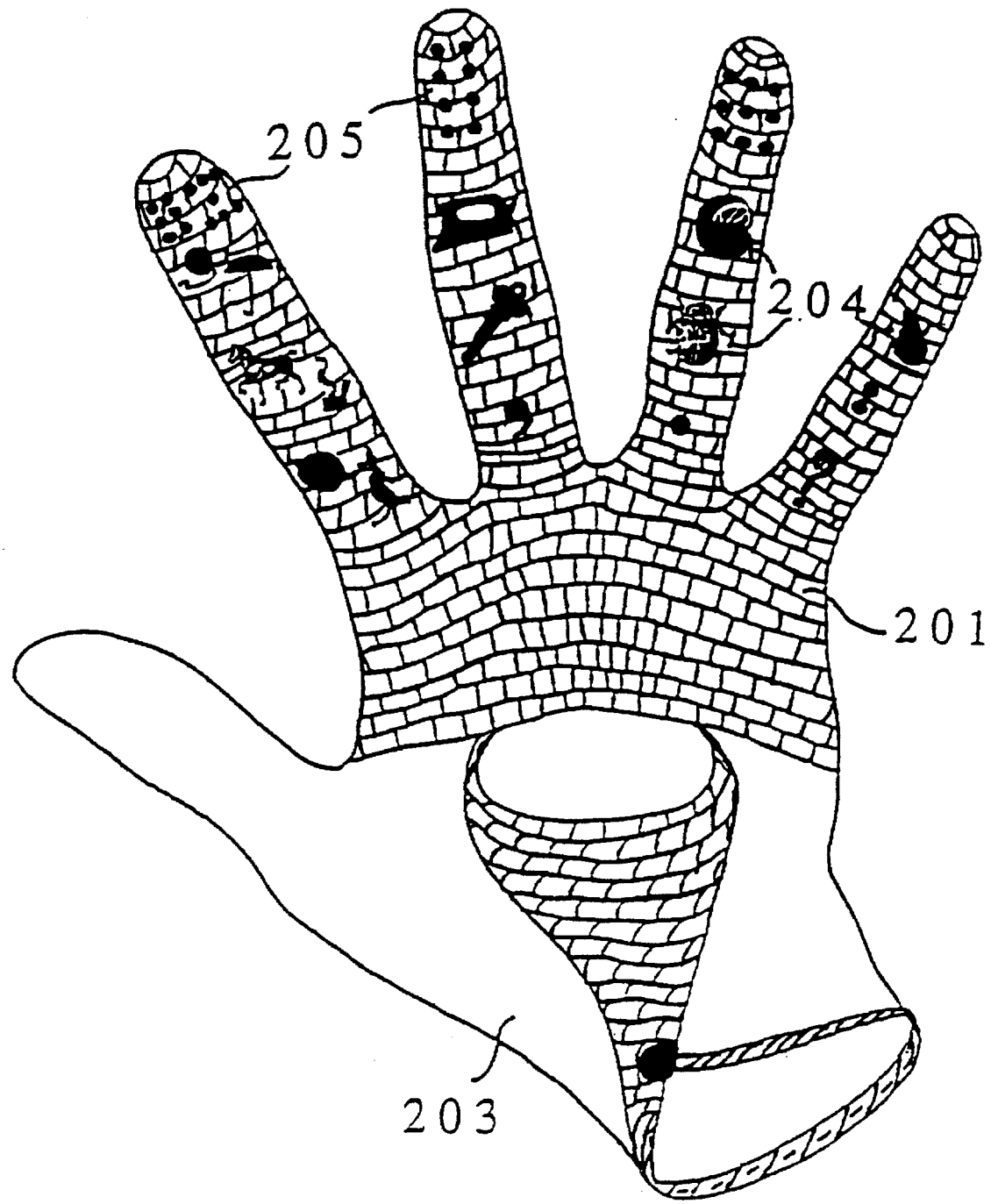
Figure 4D:
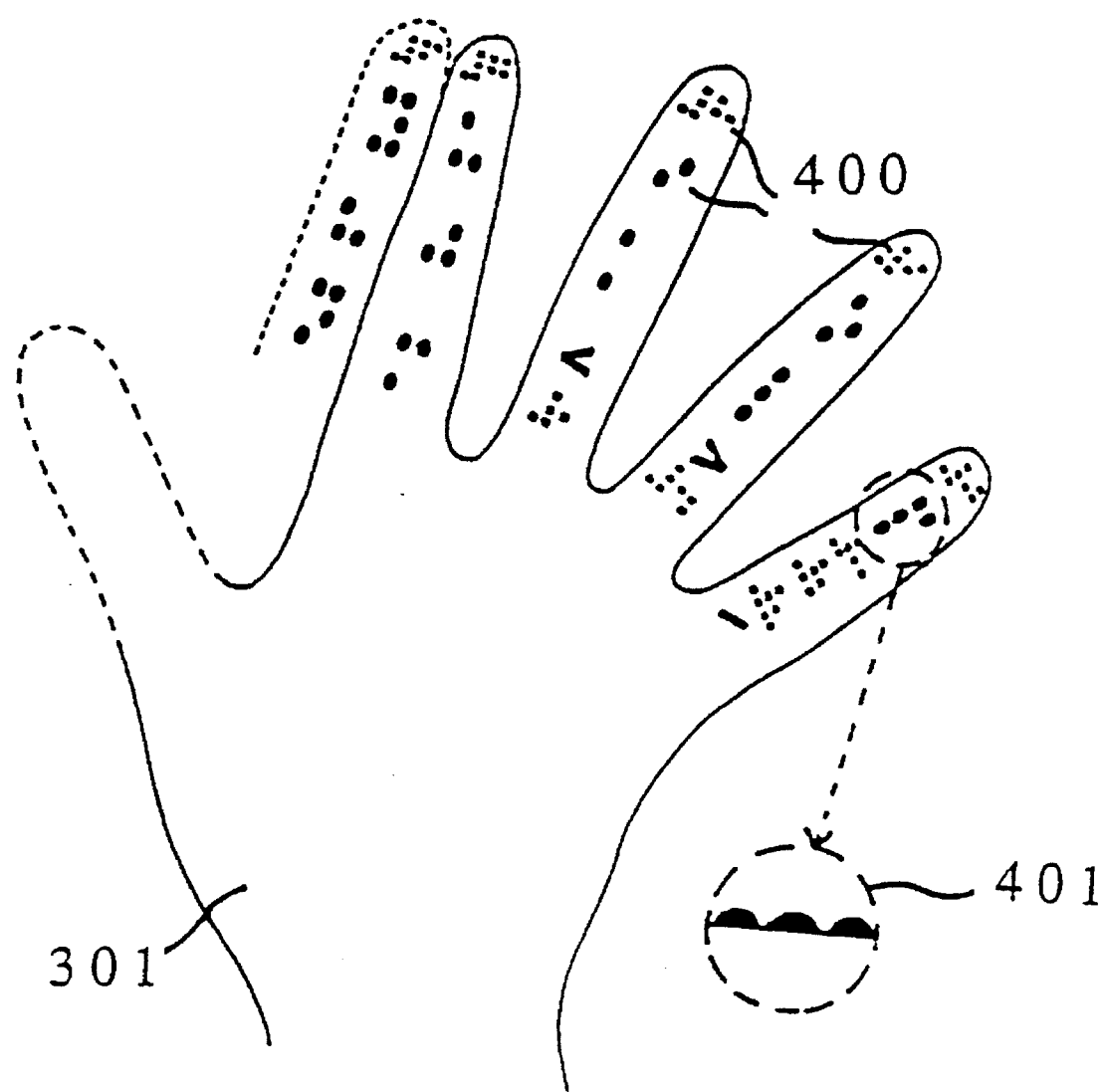
Figure 5A:
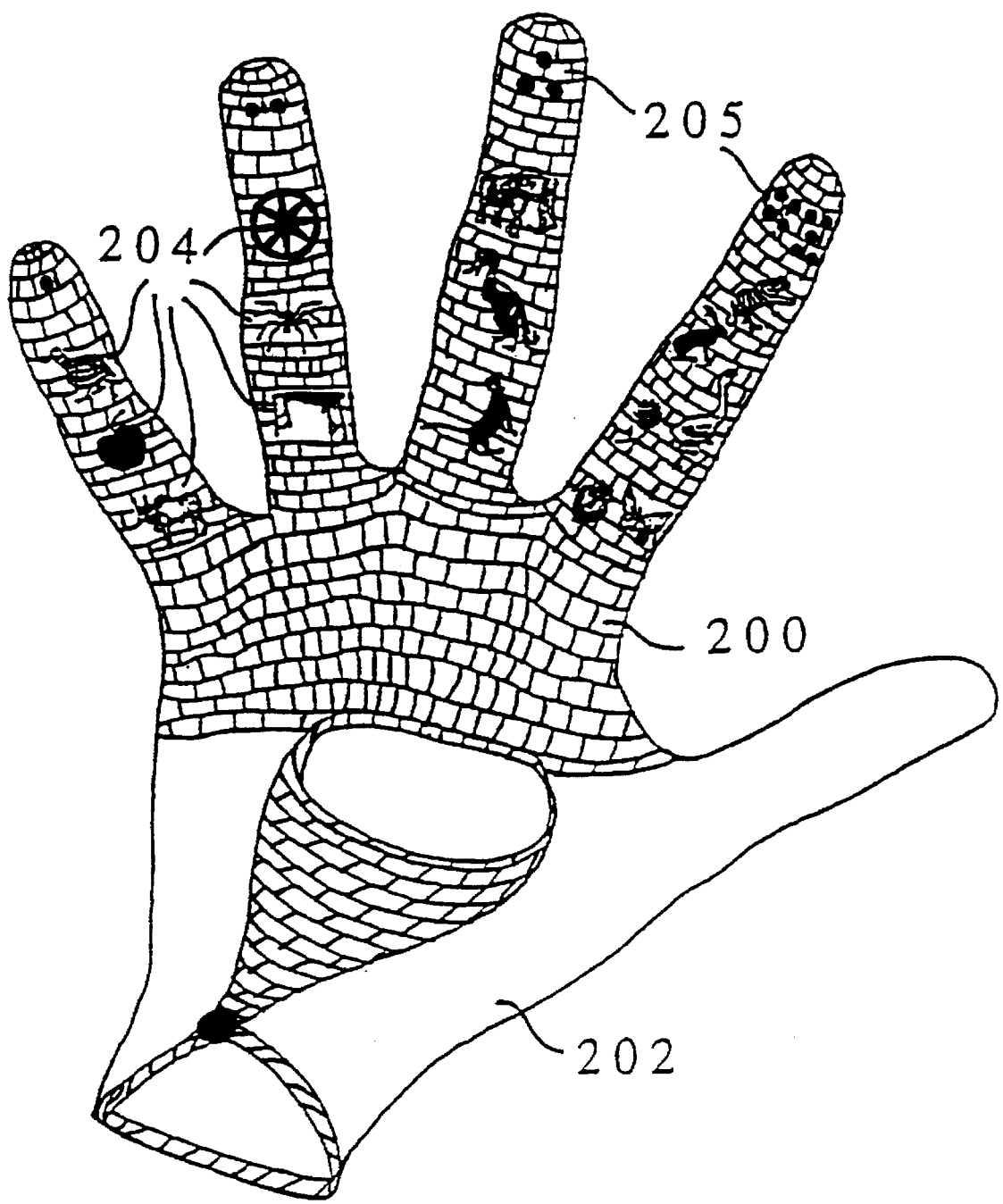
Figure 5B:
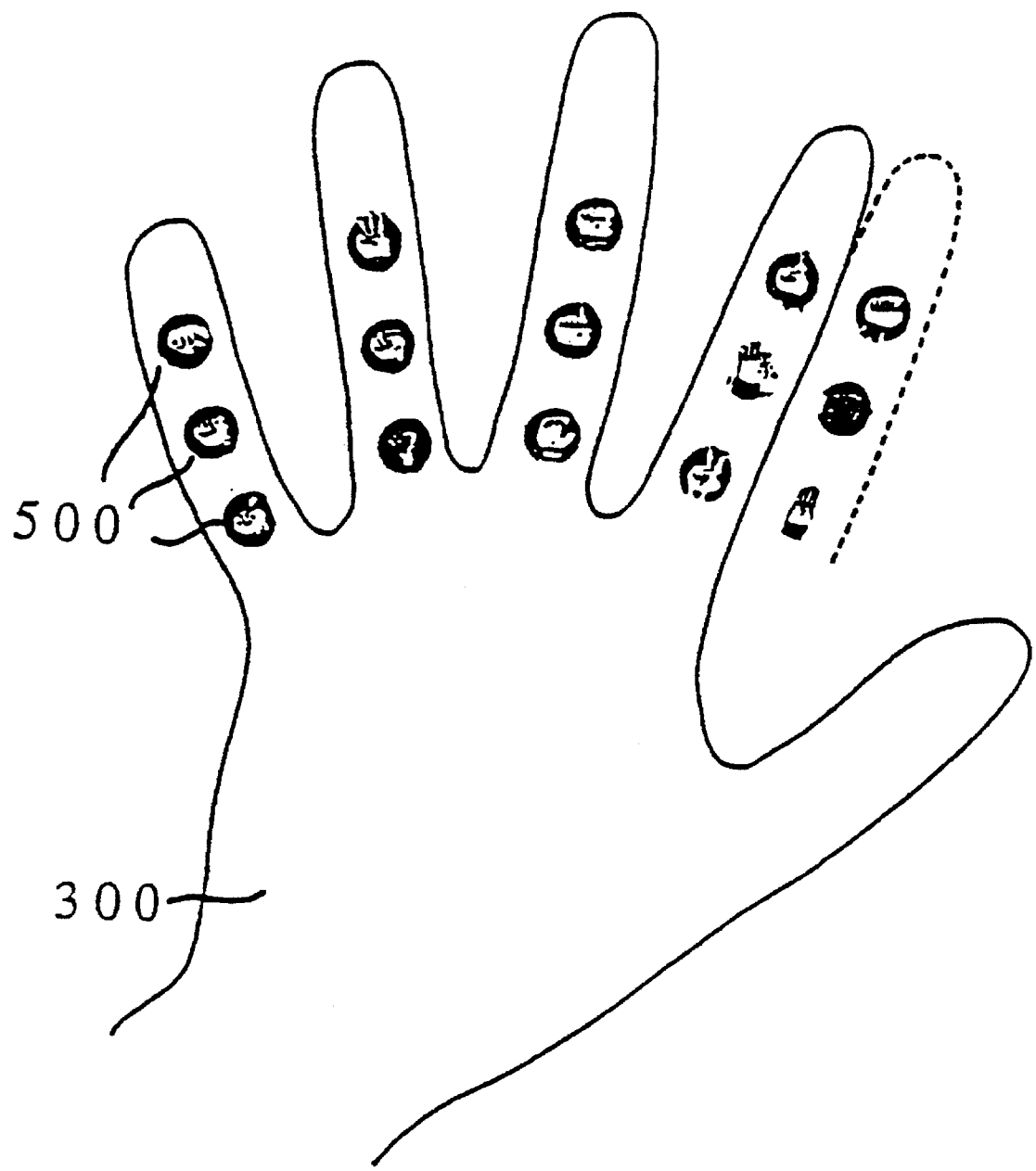
Figure 5C:
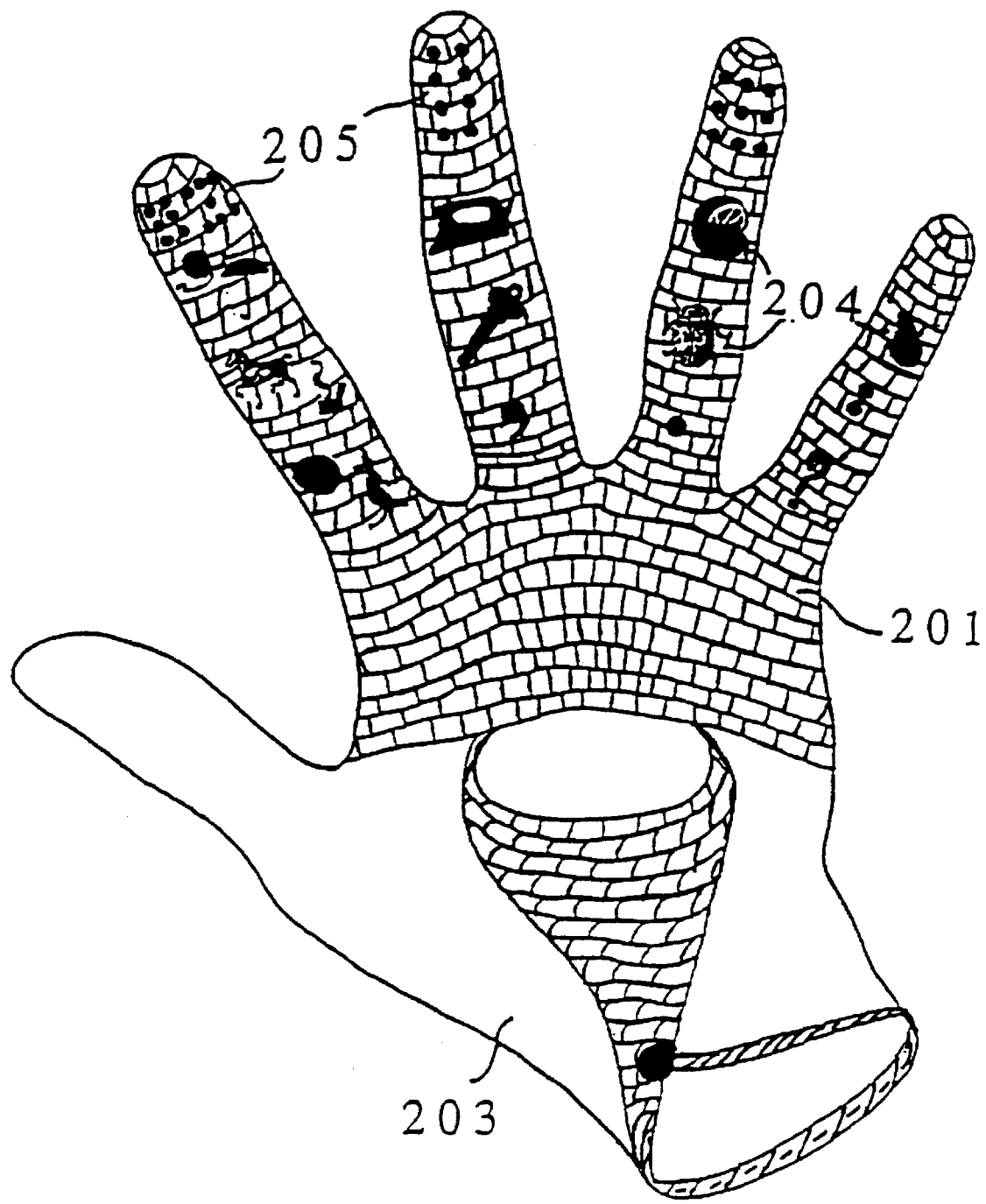
Figure 5D:
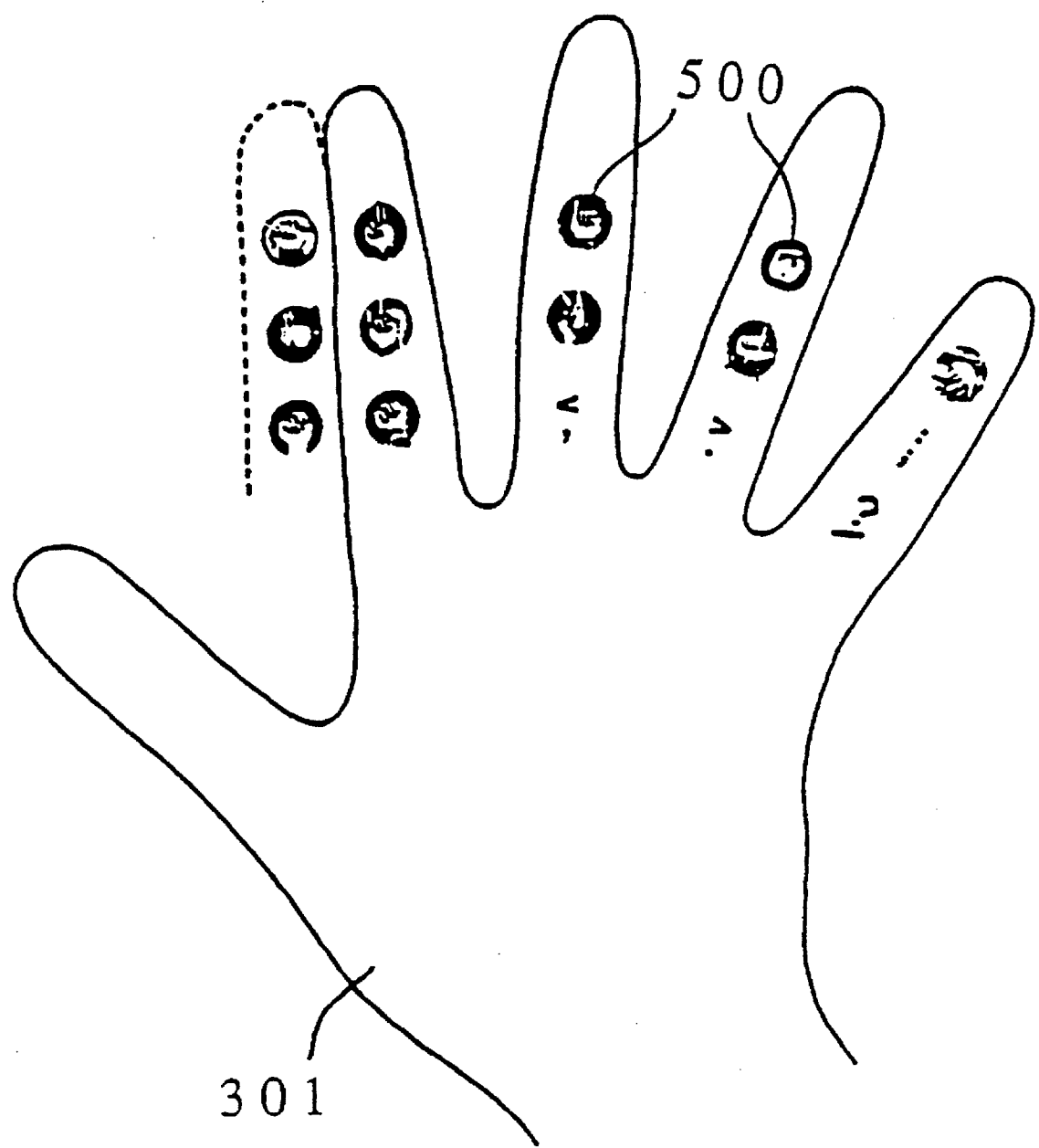

The pre-school age child who would be highly exposed to his glove images would visually memorize the spatial mapping of the spoken words which represent these images. Learning with these gloves will be continuous and dynamic. Before reaching the school age, the child will start learning the alphabet by wearing the alphanumeric/picture gloves depicted in FIG. 3, and which show how to associate the initial letter of the name of a picture with the picture itself. As shown in FIG. 3, the alphanumeric/picture gloves provide the same pictorial representation of the keyboard as the picture gloves on the back sides 200 & 201 of the gloves, yet with an additional alphanumeric representation of the keyboard on the palm sides 300 & 301 of the gloves. As shown in FIG. 3a & 3b, the letters, numbers, and punctuation symbols of the keys to be struck by the fingers of the left hand are indicated on the palm-side 300 of the corresponding fingers of the right-hand glove. For example, the letters 302 "Q", "A", and "Z" corresponding to the keys to be struck by the left little finger are precisely indicated on the palm side 300 of the little finger of the right hand glove. Likewise in FIGS. 3c & 3d, the letters, numbers, and punctuation symbols of the keys to be struck by the fingers of the right hand are indicated on the palm-side 301 of the corresponding fingers of the left hand glove.

To learn the alphabet and the numbers, the pre-school child wearing the gloves would simply have to turn one of his hands to see the correspondance between each letter and the picture which occupies the same position on the opposite hand, and which picture name begins with the same said letter.

Visually-impaired learners would benefit from the same learning process by wearing Braille-Alphanumeric/Picture Gloves which provide a Braille representation of the alphanumeric keys of the keyboard 100 on the palm sides of the gloves, as shown in FIG. 4. The palm portions of the thumbs of both Braille-Alphanumeric/ Picture Gloves are left open; and the alphanumeric characters are made of raised dots 400) to enable their tactile recognition by the person wearing the gloves, as shown in FIG. 4d by the side-view 401 of the Braille representation of the letter "P" located on the palm-side 301 of the left little finger. These raised dots 400) could be cost-effectively implemented by using "puffy" screen-printing techniques. The pictures 204 on the back-side of the Braille-Alphanumeric/Picture Gloves could also be implemented as raised surfaces using the latter techniques, or as three-dimensional objects mounted on the glove fingers in order to facilitate their tactile recognition by the visually-impaired learner wearing the gloves.

Hearing-impaired learners would also benefit from the same learning process by wearing the Sign-Language-Alphanumeric/Picture Gloves which provide a Sign-Language representation 500 of the alphanumeric keys of the keyboard on the palm sides of the gloves, as shown in FIG. 5.

School Age Group

Alphanumeric Gloves.

When the child leaves the pre-school age and enters the school age, he will normally know very well his alphabet and the numbers, if not more. As the child acquires or further develops his writing/reading skills, he can be given the (additional) opportunity to memorize the key-finger assignment of the keyboard by wearing the Alphanumeric Gloves shown in FIG. 6. The alphanumeric gloves provide a precise representation of the keyboard on the back-side of the glove fingers, by indicating the letters, numbers, and punctuation symbols of the keys to be struck by the corresponding fingers.

To learn the alphabet in the context of the key-finger assignment of the keyboard, the pre-school child wearing the alphanumeric/picture gloves had to turn the palm of one his hands towards him. After learning his alphabet, the child wearing the alphanumeric/picture gloves would have had to turn the palms of his both hands, then bring his right palm on his left-hand side, and his left palm on his right-hand side, to obtain the whole representation of the keyboard as it would appear when practising at the keyboard. There lies the motivation for the process-driven evolution of the alphanumeric/picture gloves of FIG. 3 into the alphanumeric gloves of FIG. 6: providing the child knowing his alphabet with a means for visualizing and memorizing the keyboard as it would appear to him if he were actually practising at the keyboard.

If a school child had previously learned his alphabet with the alphanumeric/ picture gloves, wearing the alphanumeric gloves would reinforce his visual memorization of the keyboard. If a school child had never used the alphanumeric/ picture gloves, he would still be given the opportunity to learn the key-finger assignment of the keyboard by wearing the alphanumeric gloves and/or the alphanumeric/picture gloves, whatever the choice. In both cases, the child will memorize the key-finger assignment of the keyboard before even using a keyboard. As a result, learning to use the keyboard will be much easier, since the child will already know which finger strikes which key. He will therefore only need to focus his attention on developing the motor skills required for efficient touch-typing.

Visually-impaired and hearing-impaired children would also benefit from the same learning opportunities with the Braille and Sign-Language implementation of the alphanumeric gloves, respectively.

The overall process of learning the key-finger assignment of the keyboard is summarized in FIG. 7 which shows the picture gloves of FIG. 2, as well as the alphanumeric gloves of FIG. 6, in relation to the standardized keyboard of FIG. 1

Word-Spelling/Picture Gloves.

As the school child simultaneously develops his reading/ writing skills, much is to be gained from an educational device that teaches him proper word-spelling in the context of the key-finger assignment. By wearing the word-spelling picture gloves depicted in FIG. 8, the child's memorization of the key-finger assignment of the keyboard is reinforced, while he learns new words and their spelling in a fun and dynamic manner. As illustrated in FIG. 8, the structure of the word-spelling/picture gloves is most simply understood as an extension of the alphanumeric/picture gloves of FIG. 3, where the letters indicated on the palm portion of each glove are replaced by the full written names 800 of the objects represented by the corresponding pictures 204 on the back portion of the other glove. In the illustration of FIG. 8, if the school child wearing the gloves turns the palm of his right hand towards himself, he very easily learns that the name of the top animal on his major left finger is given by the top name written under his right forefinger, i.e. "Elephant". He simultaneously memorizes that the letter "E" is located at the top of the third column of keys of the keyboard to be struck by the left major finger.

The series of pictures 204 or written names 800 corresponding to the same finger would be color-coded, and mounted/printed on flexible labels 801 inserted within transparent covers 802 permanently mounted on the gloves. While being cost-effective, such an implementation can meet any need for picture styles and diversity.

School Age Group And Teenagers

Language/Picture Gloves.

As the school child or teenager learns a foreign language, much is also to be gained from the language/picture gloves of FIG. 9 to synergistically teach the child foreign vocabulary in the context of the key-finger assignment of the keyboard. As seen in FIG. 9, the language/picture gloves are most simply understood as an extension of the word-spelling/gloves of FIG. 8 where the identification of the pictures 204 and the writing of said picture names 800 are both made in a foreign language 900. As the school-age child or teenager would have had by then multifarious opportunities to memorize the key-finger assignment of the keyboard, he/she could use the latter memorization to ease the learning of a foreign language. In the learning of French language for example, the letter "A" could be associated with the word "Araignée", or "spider" in English, as in the illustration of FIG. 9. The visual memorization of the "French" spider in the middle of the left little finger, together with the memorization of the "A" key corresponding to that location, will provide a mnemonic means for remembering that the french name for spider, i.e. "Araignée", starts with an "A". Owing to the associative nature of the memory process, it then becomes more easy for the school child or teenager to retrieve the word "Araignée".

Self-Expression/Picture Gloves.

As the educational process evolves, the school age or teenager will progressively develop a feeling of companionship for his mnemonic gloves which will have provided him with comfort, security, and so many joyful experiences throughout the difficult stages of his growth and development. Next to, or during the adolescence, the school child or teenager experiences one of the most challenging physical and emotional transformations of his life. Much is therefore to be gained from an educational device such as the Self-Expression/Picture gloves of FIG. 10 to alleviate the pain of this stressful transformation by encouraging the self-expression of the school child or teenager. As seen in FIG. 10, the Self-Expression/Picture Gloves are most simply understood as the following extension of the Word-Spelling/Picture Gloves of FIG. 8: the removable pictures on the back side of the gloves can now include the photos 1000 of people having a direct impact on the life of the school child or teenager, e.g. father/mother or brother/sister, and the photos of pets or familiar objects. The real names 1001 of the said people, pets, and objects are written in the corresponding finger location of the palm sides of the gloves.

By creating a real life-like situation, yet far less threatening than in reality, the self-expression/picture gloves will help the child/teenager wearing the gloves to express stressful feelings or emotions that would otherwise be difficult to verbalize. The child/teenager would then be encouraged to express himself freely, yet within the limitation of the keyboard, which would also reinforce the memorization of the keyboard.

Teenagers

Picture Rings.

The picture gloves provided the pre-school child with comfort and protection, and satisfied his needs for feeling of togetherness and control. In contrast, teenagers like challenge and diversity, and they want to be treated as adults seeking independence. It is to satisfy such needs that the picture gloves have been transformed into the picture rings 1100 illustrated in FIG. 11.

As shown in FIG. 11, the ring of the left little finger carries the pictures of a Queen, an Apple, and a Zero to indicate the QAZ-keys. The ring of the left ring-finger carries the pictures of a Whale, a Sun-shine, and a Xylophone to indicate the WSX-keys. The ring of the left major finger carries the pictures of an Elephant, a Dog, and a Cat to indicate the EDC-keys. The ring of the left forefinger carries the pictures of a Rabbit, a Fish, and a Violin to indicate the RFV-keys, and a Tree, a Goat, and Butterfly to indicate the TGB-keys.

Also in FIG. 11, the ring of the right little finger carries the picture of a Pig to indicate the P-key, and various punctuation symbols. The ring of the right ring finger carries the pictures of an Owl and a Lemon to indicate the OL-keys, and some symbols. The ring of the right major finger carries the pictures of an Ice-skate and a King to indicate the IK-keys, and some symbols. The ring of the right forefinger carries the pictures of an Umbrella, Jam, and a Mouse to indicate the UJM-keys, as well as the pictures of Yarn, a Heart, and a Nurse to indicate the YHN-keys.

These rings will give teenagers the opportunity to explore and create their own world by choosing the type of objects they like, and the type of stories that they like to create with these objects. They will also provide teenagers with a healthy and challenging means of communication among peers and with their parents. The practicality and attractiveness of these rings make them also convenient to wear during a variety of activities, such as walking, watching TV, driving, etc. Yet, these rings will also discipline the thought processes of the teenagers by forcing their imagination to remain within the limitation of the keyboard 100.

It is known that repetition and reinforcement with the aid of visualization are key factors in psycho-motor development. It is therefore expected that the variety of learning experiences provided by all of the aforementioned mnemonic gloves constitute a unique process for the child/teenager to develop the psycho-motor skills required for touch-typing.

The invention has been described in detail with particular emphasis on the preferred embodiments thereof, but it should be understood that variations and modifications within the spirit and scope of the invention may occur to those skilled in the art to which the invention pertains.

What is claimed is:

1. An adaptive educational device for learning a standardized typing keyboard having keys, said educational device comprising a left hand glove adapted to surround and cover the left hand of a learner and a right hand glove adapted to surround and cover the right hand of a learner, each of said gloves comprising a body portion and fingers extending from said body portion, said fingers corresponding to the fingers of a human hand and being adapted to surround and cover the corresponding fingers of a learner, each of said fingers having thereon indicia corresponding to the keys on said keyboard which are to be struck by the fingers of a keyboard user, said gloves being adapted to be worn by a learner when said learner is not using said keyboard.

2. An educational device according to claim 1 wherein each of said gloves further includes a thumb extending from the body portion of the glove.

3. An educational device according to claim 1 wherein each glove has a palm side and a back side and wherein said indicia are applied to the fingers on the back side of each glove.

4. An educational device according to claim 3, in which the indicia are arranged in the same order as the corresponding keys of said keyboard.

5. An educational device according to claim 3 wherein the indicia applied to the left hand glove have first shapes defining objects which object names begin with the letter corresponding to the key of the keyboard to be struck by a certain finger of the left hand, and wherein the indicia applied to the right hand glove have second shapes defining objects which object names begin with the letter corresponding to the key of the keyboard to be struck by a certain finger of the right hand.

6. An educational device according to claim 5 wherein said keyboard has color-coded keys and wherein said indicia have colors associated therewith and matching corresponding color-coded keys of the keyboard.

7. An educational device according to claim 5 wherein said left hand glove comprises a thumb portion, said right hand glove comprises a second thumb portion, wherein each thumb portion and each finger has an opening to enable tactile recognition of the shapes applied to the right hand glove and the left hand glove respectively.

8. An educational device according to claim 5 wherein said shapes of said sets of indicia comprise raised or flat surfaces on said fingers of said gloves.

9. An educational device according to claim 5 wherein said shapes of said sets of indicia comprise three-dimensional forms mounted on the fingers of said gloves.

10. An educational device according to claim 3 wherein each said set of indicia comprises phonetic, alphanumeric aids as mnemonic means for remembering/learning the location of certain keys on the keyboard.

11. An educational device according to claim 10 wherein said aids comprise one set of numeral or symbolic representations corresponding to the keys of the keyboard to be struck by the fingers of the left hand, and a further set of numeral or symbolic representations corresponding to the keys of the keyboard to be struck by the fingers of the right hand.

12. An educational device according to claim 1 wherein the indicia applied to the left hand glove comprise raised or flat surfaces indicating the precise letters, numbers, and punctuation symbols of said keys of the keyboard to be struck by the fingers of said left hand, and the indicia applied to the right hand glove comprise raised or flat surfaces indicating the letters, numbers, and punctuation symbols of said keys of the keyboard to be struck by the fingers of said right hand.

13. An educational device according to claim 1 wherein the indicia applied to the left hand glove comprise raised surfaces indicating the precise Braille representation of the letters, numbers, and punctuation symbols of the keys of the keyboard to be struck by said fingers of the left hand of a visually-impaired learner, and the indicia applied to the right hand glove comprise raised surfaces indicating the Braille representation of the letters, numbers, and punctuation symbols of said keys of the keyboard to be struck by the fingers of the right hand of a visually-impaired learner.

14. An educational device according to claim 1 wherein said left hand glove has a first set of indicia mounted as mnemonic means on the fingers thereof, said right hand glove has a second set of indicia mounted as mnemonic means on the fingers thereof, said first set of indicia on the fingers of said left hand glove having first shapes, said first shapes comprising raised or flat surfaces indicating the precise sign language representation of the letters, numbers, and punctuation symbols of the keys of the keyboard to be struck by the fingers of the left hand of a hearing impaired learner, said second set of indicia having second shapes, said second shapes comprising raised or flat surfaces indicating the precise sign language representation of the letters, numbers, and punctuation symbols of said keys of the keyboard to be struck by the fingers of the right hand of a hearing-impaired learner.

15. An educational device for learning a standardized keyboard having keys, said educational device comprising a left hand glove and a right hand glove, said left hand glove having fingers and a thumb and being adapted to fit the left hand of a learner, said right hand glove having fingers and a thumb and being adapted to fit the right hand of a learner, said left hand glove and said right hand glove each having a palm side and a back side, said left hand glove having a first portion adapted to cover the palm side of the left hand of a learner and a second portion adapted to cover the back side of the left hand of a learner, said right hand glove having a third portion adapted to cover the palm side of the right hand of a learner and a fourth portion adapted to cover the back side of the right hand of a learner, each of said gloves having a set of back side indicia applied to the back side of the fingers thereof, each of said gloves having a set of palm side indicia applied to the palm side of the fingers thereof, said back side indicia corresponding to the keys of said keyboard which are to be struck by the fingers of a learner, each set of said palm side indicia being in correspondence with a set of back side indicia, said palm side indicia comprising a first set of indicia mounted on the first portion of the fingers of said left hand glove, said palm side indicia further comprising a third set of indicia mounted on the third portion of the fingers of said right hand glove, said back side indicia comprising a second set of indicia mounted on said second portion of the fingers of the left hand glove, said back side indicia further comprising a fourth set of indicia mounted on the fourth portion of the fingers of the right hand glove, said second set of indicia corresponding to the keys of said keyboard to be struck by the fingers of the left hand, and said fourth set of indicia corresponding to the keys of said keyboard to be struck by the fingers of the right hand.

16. An educational device according to claim 15 wherein said first set of indicia is in correspondence with said fourth set of indicia, and wherein said third set of indicia is in correspondence with said second set of indicia, said first set of indicia thereby corresponding to the keys of the keyboard to be struck by the fingers of the right hand, and said third set of indicia thereby corresponding to the keys of the keyboard to be struck by the fingers of the left hand.

17. An educational device according to claim 15 wherein said first portion of said left hand glove has a first opening therein and said third portion of said right hand glove has a second opening therein, said openings enabling tactile recognition and memorization.

18. An educational device for learning a standardized keyboard as claimed in claim 17, said device further used to simultaneously learn the alphabet, wherein said second set of indicia has shapes defining objects which object names begin with letters corresponding to the keys of the keyboard to be struck by the fingers of the left hand of a visually-impaired learner, said fourth set of indicia has shapes defining objects which object names begin with letters corresponding to the keys of the keyboard to be struck by the fingers of the right hand of a visually-impaired learner, and wherein said first and third sets of indicia have raised surfaces which are the Braille representation of the letters, numbers, and punctuation symbols of keys of the keyboard to be struck by the corresponding fingers of the left and right hands of a visually-impaired learner.

19. An educational device according to claim 15 wherein said sets of indicia have shapes comprising raised or flat surfaces on said fingers of said gloves.

20. An educational device according to claim 15 wherein said sets of indicia have shapes comprising three-dimensional forms mounted on said fingers of said gloves.

21. An educational device according to claim 15 wherein said second set of indicia and said fourth set of indicia comprise mnemonic means for remembering the location of certain keys on said keyboard, said first set of indicia and said third set of indicia comprise mnemonic means for remembering the location of certain keys on said keyboard.

22. An educational device according to claim 15 wherein the keys of said keyboard are color coded and wherein the back side indicia on the fingers of said gloves have the same colors associated therewith in matching correspondence with color coded keys of the keyboard, and wherein the palm side indicia on the fingers of the gloves have the same colors associated therewith in matching correspondence with color coded back side indicia.

23. An educational device for learning a standardized keyboard as claimed in claim 15, said device further used to simultaneously learn the alphabet, wherein said second set of indicia has shapes defining objects which object names begin with letters corresponding to the keys of the keyboard to be struck by said fingers of said left hand, said fourth set of indicia has shapes defining objects which object names begin with letters corresponding to the keys of the keyboard to be struck by said fingers of said right hand, and wherein said first and third sets of indicia indicate letters, numbers, and punctuation symbols of keys of the keyboard to be struck by the corresponding fingers of said left and right hands.

24. An educational device for learning a standardized keyboard as claimed in claim 15, said device further used to simultaneously learn the alphabet, wherein said second set of indicia has shapes defining objects which object names begin with letters corresponding to the keys of the keyboard to be struck by the fingers of the left hand of a hearing-impaired learner, said fourth set of indicia has shapes defining objects which object names begin with letters corresponding to the keys of the keyboard to be struck by the fingers of the right hand of a hearing-impaired learner, and wherein said first and third sets of indicia indicate sign-language representations of the letters, numbers, and punctuation symbols of keys of the keyboard to be struck by the corresponding fingers of the left and right hands of a hearing-impaired learner.

25. An educational device for learning a standardized keyboard as claimed in claim 15, said device further used to simultaneously learn the alphabet and for learning writing, spelling and language vocabulary, wherein said second set of indicia define objects which object names begin with letters corresponding to keys of the keyboard to be struck by fingers of the left hand, said fourth set of indicia define objects which object names begin with letters corresponding to keys of the keyboard to be struck by fingers of the right hand, and wherein said first and third sets of indicia indicate the native language or foreign language spelling of the corresponding objects defined by said second and fourth sets of indicia.

26. An educational device for learning a standardized keyboard as claimed in claim 15, said device further used to simultaneously learn the alphabet and for facilitating self-expression, wherein said second set of indicia represents people, animals, or objects whose names begin with letters corresponding to keys of the keyboard to be struck by the fingers of the left hand, said fourth set of indicia represents people, animals, or objects whose names begin with letters corresponding to keys of the keyboard to be struck by the fingers of the right hand, and wherein said first and third sets of indicia indicate the names of the corresponding people, animals, or objects defined by said second and fourth sets of indicia.

27. An educational device as claimed in claim 15 wherein said indicia are permanently mounted on the fingers of said gloves.

28. An educational device according to claim 15 wherein said indicia are removably mounted on the fingers of said gloves.

29. An educational device according to claim 28 wherein said indicia are attached to bases permanently mounted on said fingers of said gloves, said bases indicating the letters of the keys of the keyboard corresponding to said indicia.

30. An educational device according to claim 29 wherein said indicia are attached to bases by hooks and loops, releasable fasteners.

31. An educational device according to claim 28 wherein said indicia are inserted within a transparent cover permanently mounted on said fingers of said gloves.

32. An educational device for learning a standardized keyboard having keys, said educational device comprising a left hand glove and a right hand glove, said left hand glove having fingers and a thumb and being adapted to fit the left hand of a learner, said right hand glove having fingers and a thumb and being adapted to fit the right hand of a learner, said left hand glove and said right hand glove each having a palm side and a back side, said left hand glove having a first portion adapted to cover the palm side of the left hand of a learner and a second portion adapted to cover the back side of the left hand of a learner, said right hand glove having a third portion adapted to cover the palm side of the right hand of a learner and a fourth portion adapted to cover the back side of the right hand of a learner, said first portion of said left hand glove having a first opening therein, said third portion of said right hand glove having a second opening therein, said left hand glove having a first set of indicia mounted on the first portion thereof, said left hand glove having a second set of indicia mounted on the second portion thereof, said right hand glove having a third set of indicia mounted on said third portion thereof, said right hand glove having a fourth set of indicia mounted on said fourth portion thereof, said first set of indicia corresponding to the keys on said keyboard to be struck by said right hand and fingers, said second set of indicia corresponding to the keys on the keyboard to be struck by said left hand and fingers, said third set of indicia corresponding to keys on said keyboard to be struck by the left hand and fingers, said fourth set of indicia corresponding to keys on said keyboard to be struck by the right hand and fingers, said first opening of said first portion of said first glove enabling tactile recognition and memorization, said second opening of said third portion of said right hand glove enabling tactile recognition and memorization.

\* \* \* \* \*